United States Patent
Iwai et al.

(10) Patent No.: US 9,819,428 B2
(45) Date of Patent: Nov. 14, 2017

(54) INFORMATION DISTRIBUTION SYSTEM, SERVICE CONTROL DEVICE, GATEWAY DEVICE, CONTROL METHOD, AND NON-TRANSITORY COMPUTER READABLE MEDIUM

(71) Applicant: NEC Corporation, Tokyo (JP)

(72) Inventors: Takanori Iwai, Tokyo (JP); Hajime Zembutsu, Tokyo (JP)

(73) Assignee: NEC Corporation, Tokyo (JP)

( * ) Notice: Subject to any disclaimer, the term of this patent is extended or adjusted under 35 U.S.C. 154(b) by 178 days.

(21) Appl. No.: 14/646,749

(22) PCT Filed: Sep. 25, 2013

(86) PCT No.: PCT/JP2013/005652
§ 371 (c)(1),
(2) Date: May 22, 2015

(87) PCT Pub. No.: WO2014/083733
PCT Pub. Date: Jun. 5, 2014

(65) Prior Publication Data
US 2015/0311991 A1    Oct. 29, 2015

(30) Foreign Application Priority Data

Nov. 29, 2012  (JP) .................................. 2012-260718

(51) Int. Cl.
*H04M 3/493* (2006.01)
*H04H 20/71* (2008.01)
(Continued)

(52) U.S. Cl.
CPC ............ *H04H 20/71* (2013.01); *H04H 60/19* (2013.01); *H04H 60/53* (2013.01); *H04L 12/18* (2013.01);
(Continued)

(58) Field of Classification Search
CPC . H04W 40/02; H04W 72/1257; H04W 84/18; H04W 4/005; H04W 4/06;
(Continued)

(56) References Cited

U.S. PATENT DOCUMENTS

2003/0014521 A1 * 1/2003 Elson .................... G06F 9/5011
709/225
2004/0136408 A1    7/2004 Tomobe et al.
(Continued)

FOREIGN PATENT DOCUMENTS

CA        2591540         6/2006
EP     2 302 959 A1       3/2011
(Continued)

OTHER PUBLICATIONS

International Search Report corresponding to PCT/JP2013/005652, dated Dec. 3, 2013, 2 pages.
(Continued)

*Primary Examiner* — Joseph Arevalo
(74) *Attorney, Agent, or Firm* — Wilmer Cutler Pickering Hale and Dorr LLP

(57) ABSTRACT

In order to deal with the need for diversified information distribution, the present invention aims at providing an information distribution system, a gateway device, a distribution control method, and a program that can be utilized by various business operators etc. The information distribution system in accordance with the present invention includes an event detection device (10) configured to detect occurrence of a plurality of events, and designate distribution region information of event information according to the events. Furthermore, the information distribution system includes a distribution device (20) that distributes the event informa-
(Continued)

| REGION INFORMATION | BASE STATION |
|---|---|
| REGION A | eNB#1, eNB#2, eNB#3 |
| REGION B | eNB#4, eNB#5, eNB#6 |
| REGION C (ALONG THE NATIONAL ROUTE X) | eNB#7, eNB#8 | tion to a distribution destination node corresponding to the distribution region information designated by the event detection device (10).

39 Claims, 18 Drawing Sheets

(51) Int. Cl.
| | |
|---|---|
| *H04M 11/08* | (2006.01) |
| *H04W 4/22* | (2009.01) |
| *H04L 12/18* | (2006.01) |
| *H04M 3/00* | (2006.01) |
| *H04H 60/19* | (2008.01) |
| *H04H 60/53* | (2008.01) |
| *H04W 8/02* | (2009.01) |
| *H04W 4/06* | (2009.01) |
| *H04W 4/00* | (2009.01) |
| *H04W 88/02* | (2009.01) |
| *H04W 88/08* | (2009.01) |
| *H04W 88/16* | (2009.01) |

(52) U.S. Cl.
CPC ...... *H04L 12/1845* (2013.01); *H04L 12/1895* (2013.01); *H04M 3/00* (2013.01); *H04M 11/08* (2013.01); *H04W 4/22* (2013.01); *H04W 8/02* (2013.01); *H04W 4/005* (2013.01); *H04W 4/06* (2013.01); *H04W 88/02* (2013.01); *H04W 88/08* (2013.01); *H04W 88/16* (2013.01)

(58) Field of Classification Search
CPC ....... H04W 4/22; H04W 88/02; H04W 88/08; H04W 88/16; H04W 8/02; H04H 20/71; H04H 60/19; H04H 60/53
USPC ...... 455/414.2, 446, 407, 406, 405, 522, 62, 455/517
See application file for complete search history.

(56) References Cited

U.S. PATENT DOCUMENTS

| | | | |
|---|---|---|---|
| 2007/0077922 A1* | 4/2007 | Kim | H04H 20/57 455/414.2 |
| 2008/0261554 A1 | 10/2008 | Keller et al. | |
| 2013/0155954 A1* | 6/2013 | Wang | H04W 4/005 370/328 |

FOREIGN PATENT DOCUMENTS

| | | |
|---|---|---|
| EP | 2317784 A1 | 5/2011 |
| EP | 2843976 A1 | 3/2015 |
| IL | 183914 B | 11/2010 |
| JP | 2002/141930 | 5/2002 |
| JP | 2004-221913 A | 8/2004 |
| JP | 2005-045831 A | 2/2005 |
| JP | 2007/074449 | 3/2007 |
| JP | 2007-104617 | 4/2007 |
| JP | 2008/526058 A | 7/2008 |
| JP | 2009/130558 | 6/2009 |
| JP | 2009/290669 A | 12/2009 |
| JP | 2010-045747 A | 2/2010 |
| JP | 2010/288101 A | 12/2010 |
| WO | WO-2006/066629 | 6/2006 |
| WO | WO-2012/132015 A1 | 10/2012 |

OTHER PUBLICATIONS

Extended European Search Report issued in European Patent Application No. 13858577.3, dated Jun. 23, 2016, 16 pages.
3GPP "3rd Generation Partnership Project; Technical Specification Group Core Network and Terminals; Technical Realization of Cell Broadcast Service (CBS)(Release 11)", 3GPP TS 23.041, vol. CT WG1, No. V11.4.0, Sep. 21, 2012, pp. 1-62.
3GPP "3rd Generation Partnership Project; Technical Specification Group Services and System Aspects; Machine-Type and Other Mobile Data Applications Communications Enhancements (Release 12)", 3GPP TR 23.887, vol. SA WG2, No. V0.5.0, Nov. 28, 2012, pp. 1-95.

* cited by examiner

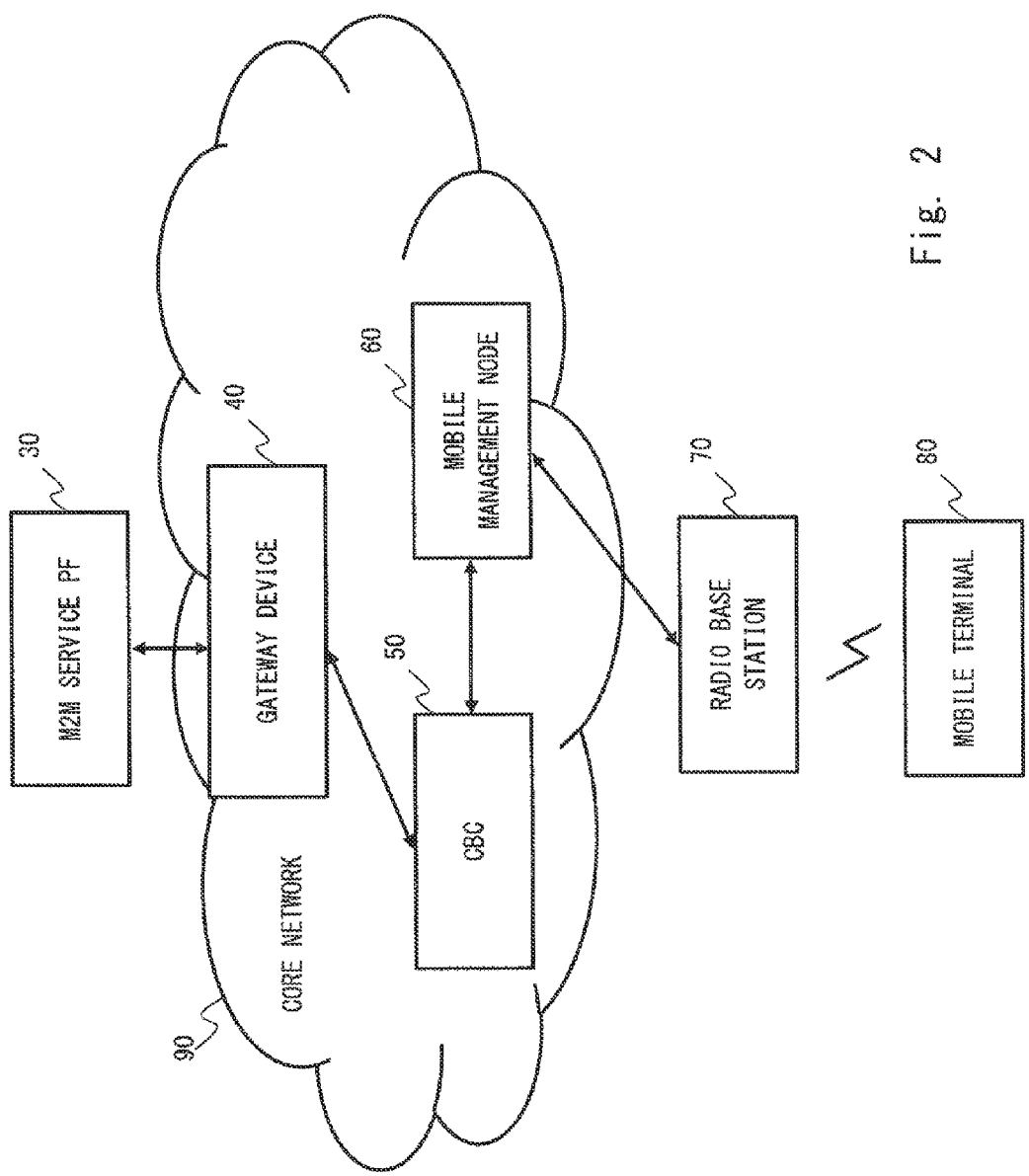

| REGION INFORMATION | BASE STATION |
|---|---|
| REGION A | eNB#1, eNB#2, eNB#3 |
| REGION B | eNB#4, eNB#5, eNB#6 |
| REGION C (ALONG THE NATIONAL ROUTE X) | eNB#7, eNB#8 |

Fig. 4

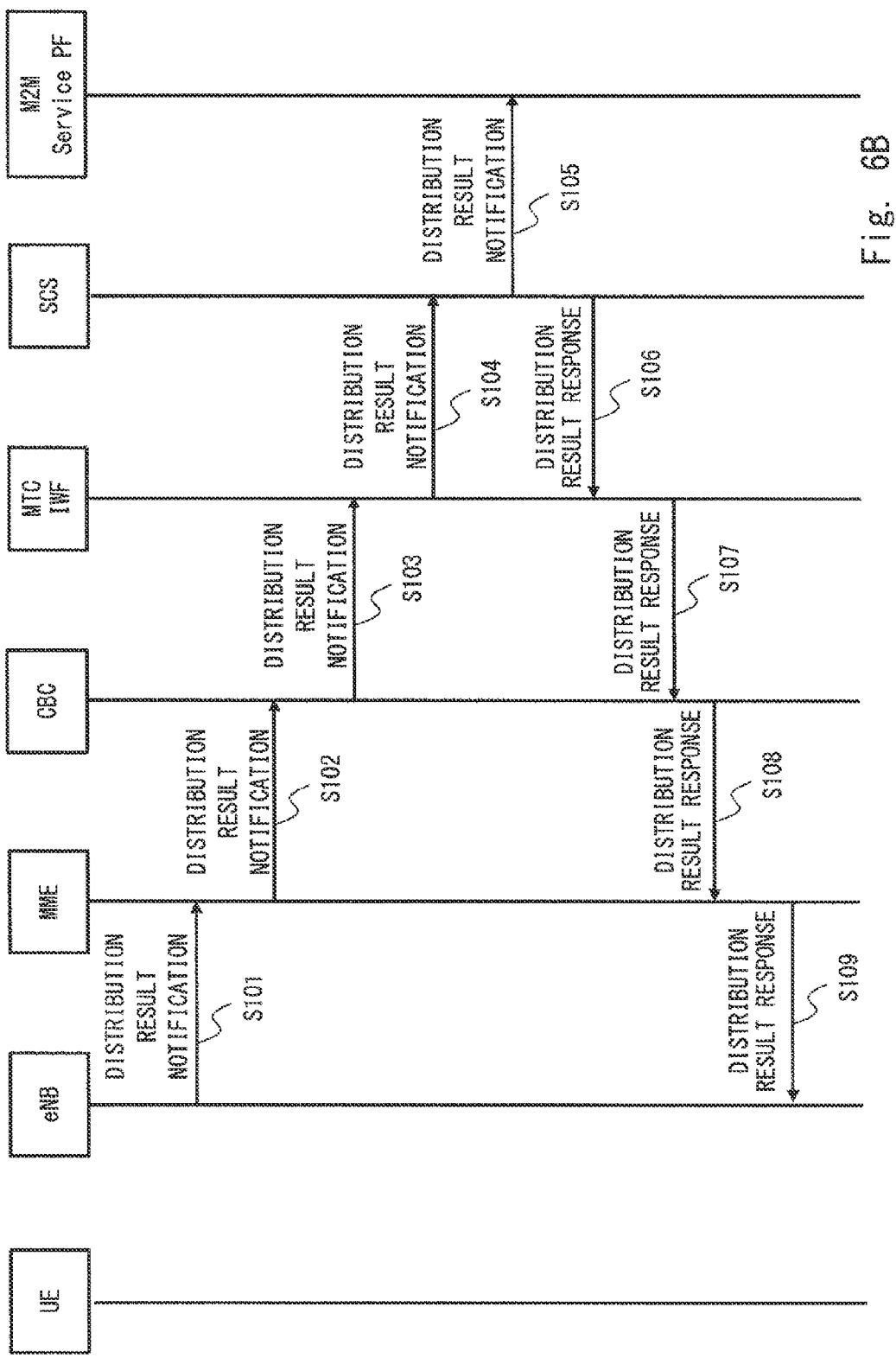

| BUSINESS OPERATOR | PRIORITY |
|---|---|
| BUSINESS OPERATOR A | PRIORITY_1 |
| BUSINESS OPERATOR B | PRIORITY_2 |
| BUSINESS OPERATOR C | PRIORITY_3 |

Fig. 8A

| PRIORITY | SERVICE PURPOSE | SPECIFIC EXAMPLE |
|---|---|---|
| HIGH ↕ LOW | DISASTER INFORMATION | EARTHQUAKE, TSUNAMI, FIRE, THUNDER, FLOOD, TORNADO, ETC. |
| | SECURITY INFORMATION | CRIME PREVENTION, SECURITY, SAFETY CONFIRMATION, ETC. |
| | MEDICAL INFORMATION | SUDDEN ILLNESS, EMERGENCY CASE, ETC. |
| | TRAFFIC INFORMATION | TRAFFIC JAM/ SERVICE SUSPENSION INFORMATION, ETC. |
| | POWER INFORMATION | POWER CONTROL, ETC. |
| | WEATHER INFORMATION | WEATHER REPORT, ETC. |
| | ADVERTISEMENT | POP-UP ADVERTISEMENT, ETC. |
| | TEST | DISTRIBUTION TEST DIRECTED TO M2M, ETC. |

Fig. 8B

| DISTRIBUTION CONTENT | DATA FORMAT |
|---|---|
| CHARACTER INFORMATION | TEXT MESSAGE |
| ROUTE INFORMATION | MAP DATA |
| DEVICE CONTROL | DEVICE CONTROL SIGNAL |

Fig. 12

INFORMATION DISTRIBUTION SYSTEM, SERVICE CONTROL DEVICE, GATEWAY DEVICE, CONTROL METHOD, AND NON-TRANSITORY COMPUTER READABLE MEDIUM

CROSS-REFERENCE TO RELATED APPLICATIONS

This application is a national stage application of International Application No. PCT/JP2013/005652 entitled "INFORMATION DISTRIBUTION SYSTEM, SERVICE CONTROL DEVICE, GATEWAY DEVICE, CONTROL METHOD, AND NON-TRANSITORY COMPUTER READABLE MEDIUM," filed on Sep. 25, 2013, which claims the benefit of the priority of Japanese Patent Application No. 2012-260718, filed on Nov. 29, 2012, the disclosures of each of which are hereby incorporated by reference in their entirety.

TECHNICAL FIELD

The present invention relates to an information distribution system and, in particular, to an information distribution system that changes a distribution region according to an event.

BACKGROUND ART

In recent years, a CBS (Cell Broadcast Service) has been used as an emergency information distribution system in a mobile network. The CBS notifies cellular phone terminals present in a target area to which emergency information is distributed of the emergency information by a simultaneous broadcast. In addition, an ETWS (Earthquake and Tsunami Warning System) is prescribed in order to deal with an increase in speed of disaster notification, and flexibility of a distribution area.

For example, the increase in speed of the disaster notification is achieved by separately distributing two types of signals of a first report to distribute the most urgent minimum information portion, such as "occurrence of earthquake", by the fastest speed, and a second report to distribute supplementary information, such as seismic intensity and an epicenter of the earthquake.

Furthermore, the flexibility of the distribution area is achieved by properly using the distribution area at three levels, a Cell level, a TA (Tracking Area) level, and an EA (Emergency Area) level.

Here, in relation to the flexibility of the distribution area, Patent Literature 1 discloses a configuration in which the distribution area is designated in a wide region unit or sector unit as the distribution area of an emergency message.

CITATION LIST

Patent Literature

Patent Literature 1: Japanese Unexamined Patent Application Publication No. 2010-45747

SUMMARY OF INVENTION

Technical Problem

It is assumed that there will be a need to diversify the kinds of emergency information distributed in the future. For example, currently, in emergency information distribution using the CBS, emergency information on an earthquake and tsunami is distributed. However, in the future, it is desired that emergency information other than that on natural disasters should also be distributed. Furthermore, as for distribution destinations, it is desired that emergency information etc. be distributed to regions desired by a business operator etc. who request distribution of the emergency information. However, since the current CBS does not have a system configuration dealing with such diversified needs, it is necessary to further improve the system in order to deal with these diversified needs.

The present invention aims at providing an information distribution system, a service control device, a gateway device, a control method, and a program in which a configuration in a mobile communication network is made clear that distributes to a mobile station simultaneous transmission information desired to be broadcast and distributed by a business operator etc. in order to deal with the need for diversified information distribution.

Solution to Problem

An information distribution system in accordance with a first aspect of the present invention includes: an external network having an event detection device that detects occurrence of a plurality of events and designates distribution region information, which is a distribution region of event information, according to the events; and a mobile communication network having a service control device that receives the distribution region information from the event detection device, a broadcast distribution device that broadcasts and distributes simultaneous transmission information on the events which have occurred to a mobile station present in the distribution region, and a gateway device that specifies a distribution node that manages the mobile station that receives the simultaneous transmission information based on the distribution region information, and notifies the broadcast distribution device of the specified distribution node.

A service control device in accordance with a second aspect of the present invention includes: a reception unit that receives distribution region information from an event detection device that is arranged in an external network, detects occurrence of a plurality of events, and designates the distribution region information, which is a distribution region of event information, according to the events; and a transmission unit that transmits the distribution region information to a gateway device that specifies a distribution node that manages a mobile station present in the distribution region, and broadcasts and distributes simultaneous transmission information on the events which have occurred to the mobile station, in broadcasting and distributing the simultaneous transmission information to the mobile station.

A gateway device in accordance with a third aspect of the present invention includes a notification unit that specifies a distribution node that manages a mobile station present in a distribution region that receives simultaneous transmission information on a plurality of events which have occurred based on distribution region information, and notifies a broadcast distribution device of the specified distribution node, the broadcast distribution device broadcasting and distributing the simultaneous transmission information to the mobile station, when occurrence of the events is detected, and the distribution region information, which is the distribution region of event information, is designated according to the events by an event detection device arranged in an external network.

A control method in accordance with a fourth aspect of the present invention is a method for: receiving distribution region information from an event detection device that is arranged in an external network, detects occurrence of a plurality of events, and designates the distribution region information, which is a distribution region of event information, according to the events; and transmitting the distribution region information to a gateway device that specifies a distribution node that manages a mobile station present in the distribution region, and broadcasts and distributes simultaneous transmission information on the events which have occurred to the mobile station, in broadcasting and distributing the simultaneous transmission information to the mobile station.

A program in accordance with a fifth aspect of the present invention makes a computer execute the steps of: receiving distribution region information from an event detection device that is arranged in an external network, detects occurrence of a plurality of events, and designates the distribution region information, which is a distribution region of event information, according to the events; and transmitting the distribution region information to a gateway device that specifies a distribution node that manages a mobile station present in the distribution region, and broadcasts and distributes simultaneous transmission information on the events which have occurred to the mobile station, in broadcasting and distributing the simultaneous transmission information to the mobile station.

Advantageous Effects of Invention

According to the present invention, an information distribution system, a service control device, a gateway device, a control method, and a program in which a configuration in a mobile communication network is made clear that distributes to a mobile station simultaneous transmission information desired to be broadcast and distributed by a business operator etc. in order to deal with the need for diversified information distribution.

BRIEF DESCRIPTION OF THE DRAWINGS

FIG. 2 is a configuration diagram of the information distribution system in accordance with the embodiment 1.

FIG. 4 is a configuration table of an NW configuration information DB in accordance with the embodiment 1.

FIG. 6B is a sequence showing a flow of signals regarding distribution result notification of the information distribution system in accordance with the embodiment 1.

FIG. 8A is a configuration table of a priority information DB in accordance with the embodiment 2.

FIG. 8B is a configuration table of the priority information DB in accordance with the embodiment 2.

FIG. 12 is a configuration table of a data format information DB in accordance with the embodiment 3.

DESCRIPTION OF EMBODIMENTS (Embodiment 1)

Figure 1:
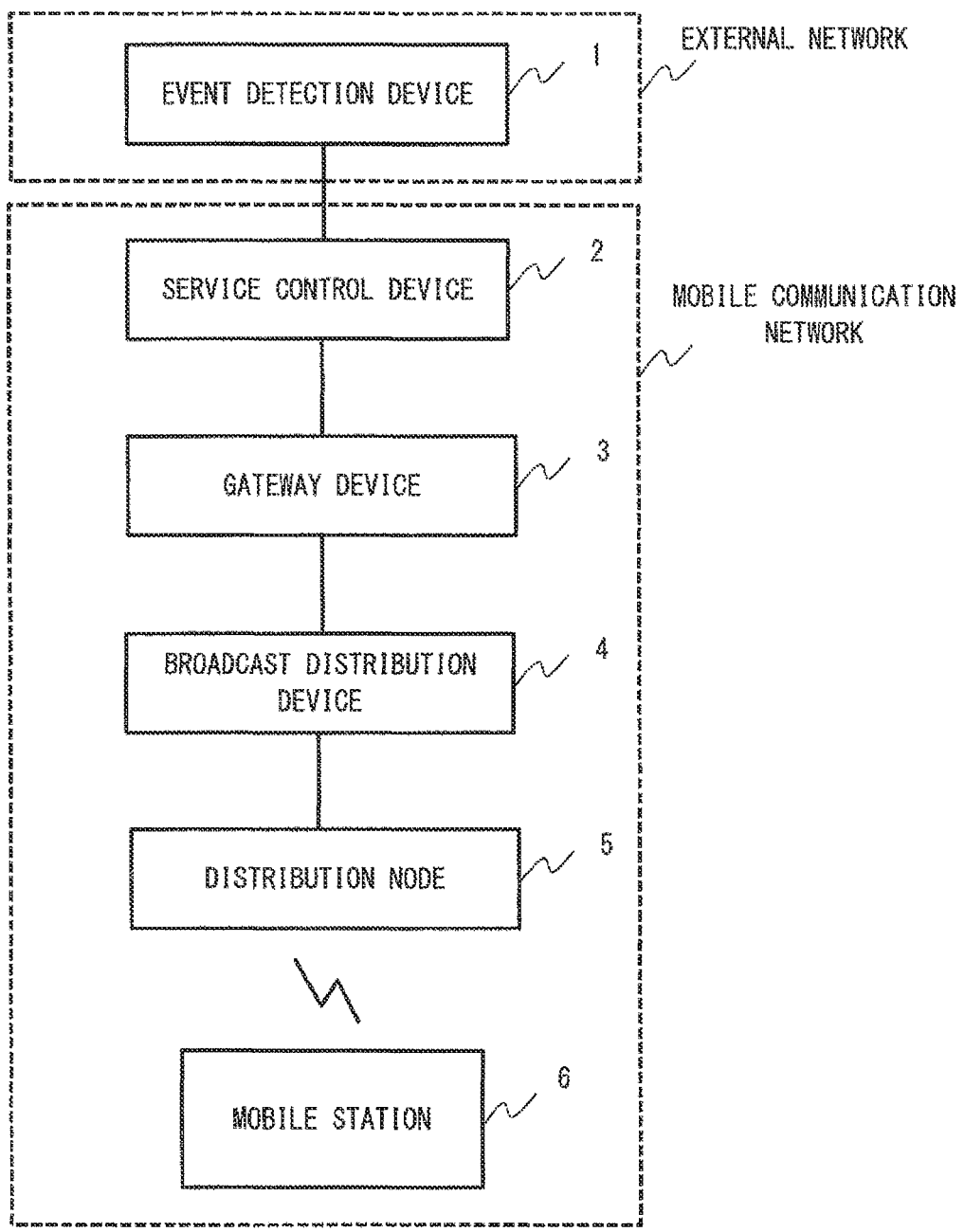
FIG. 1 is a configuration diagram of an information distribution system in accordance with an embodiment 1.

Hereinafter, embodiments of the present invention will be explained with reference to drawings. First, a configuration example of an information distribution system in accordance with an embodiment 1 of the present invention will be explained using FIG. 1. The information distribution system of FIG. 1 includes an external network and a mobile communication network.

First, a configuration example of the external network will be explained. The external network has an event detection device 1. The event detection device 1 detects occurrence of a plurality of events. Furthermore, the event detection device 1 designates distribution region information of event information according to the detected events. The events which occur include, for example, natural disasters, such as an earthquake and tsunami; a fire; a traffic accident; a crime; etc. Furthermore, the events may also include incidental events accompanying the occurrence of the above-mentioned events, such as dispatch of an emergency vehicle in response to the occurrence of the fire, the traffic accident, etc.

The event detection device 1 detects occurrence of these above events. For example, the event detection device 1 may detect occurrence of a natural disaster by being notified of the occurrence of the natural disaster through a computer connected to a government agency. Furthermore, the event detection device 1 may detect occurrence of a fire, a traffic accident, a crime, etc. by being notified of the occurrence of the fire, the traffic accident, the crime, etc. through a computer connected to a fire station or a police station. Furthermore, the event detection device 1 may detect dispatch of an emergency vehicle by communicating with a communication device etc. mounted in the emergency vehicle.

Distribution region information, for example, may be information that designates a range within several meters or several kilometers radius from a point where a natural disaster, a fire, an accident, a crime, or the like has occurred. Alternatively, the distribution region information may be information that designates a range within several kilometers in directions up and down from a point of a highway where a traffic accident has occurred. Alternatively, the distribution region information may be information on a travel route of the emergency vehicle. The event detection device 1 notifies the mobile communication network of the designated distribution region information.

Next, a configuration example of the mobile communication network will be explained. The mobile communication network includes: a service control device 2; a gateway device 3; a broadcast distribution device 4; a distribution node 5; and a mobile station 6.

The service control device 2 receives the distribution region information transmitted from the event detection device 1. When the service control device 2 receives the distribution region information, it transmits the received distribution region information to the gateway device 3.

The broadcast distribution device 4 broadcasts and distributes simultaneous transmission information on the events detected in the event detection device 1 to the mobile station 6 present in a distribution region indicated in the distribution region information transmitted from the event detection device 1.

The gateway device 3 receives the distribution region information transmitted from the service control device 2. The gateway device 3 specifies the distribution node 5 that manages the mobile station 6 that receives the simultaneous transmission information based on the received distribution region information. Furthermore, the gateway device 3 notifies the broadcast distribution device 4 of the specified distribution node. Here, the distribution node, for example, may be a base station, a base station management device, or a node device in the mobile communication network. Furthermore, when constructing a wireless LAN (Local Area Network), the distribution node may be an access point.

As explained above, there is clearly shown in FIG. 1 the configuration of the mobile communication network that broadcasts and distributes the simultaneous transmission information to the distribution region information designated by event detection device arranged in the external network. By using such mobile communication network, the distribution node that broadcasts and distributes the simultaneous transmission information can be specified based on the distribution region information designated by the event detection device. Therefore, broadcast distribution can be performed through the mobile communication network according to a distribution request of the event detection device arranged in the external network.

In addition, since by using the information distribution system of FIG. 1, it becomes possible to perform information distribution according to occurrence of various events, and further, a distribution destination of information can be decided for each event, the information can be accurately distributed to a region needing it.

Subsequently, a detailed configuration example of the information distribution system in accordance with the embodiment 1 of the present invention will be explained using FIG. 2. The information distribution system of FIG. 2 includes: an M2M (Machine to Machine) service PF 30; a gateway device 40; a CBC (Cell Broadcast Center) 50; a mobile management node 60; a radio base station 70; and a mobile terminal 80. The gateway device 40, the CBC 50, and the mobile management node 60 are arranged in a core network 90 in the mobile communication network. The devices arranged in the core network 90 and the radio base station 70 are devices managed by a mobile network operator. Therefore, the M2M service PF 30 may be a platform provided by a business operator different from the mobile network operator, or may be a platform managed by the mobile network operator.

The M2M service PF 30 corresponds to the event detection device 1 in FIG. 1. The M2M service PF 30 receives event occurrence information, such as natural disasters, such as an earthquake and a tsunami, a fire, a traffic accident, a crime, through computers arranged in respective organizations of a government agency, a police station, a fire station, etc. The M2M service PF 30 additionally receives information on locations where respective events have occurred. The M2M service PF 30 decides distribution region information on a region to which event information is distributed based on the locations where the events have occurred. The M2M service PF 30 transmits a distribution request including the event information and the distribution region information to the gateway device 40.

The gateway device 40 has functions of the service control device 2 and the gateway device 3 in FIG. 1. The gateway device 40 relays a communication between the M2M service PF 30 and the devices in the core network 90. That is, the gateway device 40 has an interface for communicating with an external network outside the core network 90, and further has an interface for communicating with the devices in the core network 90. As a result of this, the gateway device 40 functions as a gateway device with the external network. In addition, the gateway device 40 may be configured using two devices of an SCS (Service Capability Server) and an MTC IWF. In this case, the service control device 2 of FIG. 1 corresponds to the SCS, and the gateway device 3 corresponds to the MTC IWS. Configurations of the SCS and the MTC-IWF will be explained in detail later. The gateway device 40 receives the distribution request transmitted from the M2M service PF 30.

The gateway device 40 specifies a distribution destination node corresponding to the received distribution region information. The gateway device 40 transmits to the CBC 50 a distribution request including the event information and the specified distribution destination node information.

Here, the gateway device 40 may execute authentication processing regarding whether or not the information transmitted from the M2M service PF 30 is permitted to be transferred into the core network 90. For example, in receiving the distribution request of the event information, the gateway device 40 may determine whether or not the distribution request is the one regarding the organization in which the event information is previously permitted to be transferred into the core network 90. That is, the gateway device 40 may manage information on a list of the organizations that permit the transfer of the distribution requests. Alternatively, the gateway device 40 may manage information on a list of event information that can be transferred to the devices in the core network 90. In addition, when the gateway device 40 is configured using the SCS and the MTC IWF, the SCS directly accessed from the M2M service PF 30 may execute the authentication processing.

Furthermore, the gateway device 40 may execute determination processing regarding whether to transfer the distribution request transmitted from the M2M service PF 30 to the CBC 50 according to a processing load situation of the CBC 50, which is a destination of the distribution request. The gateway device 40 may regularly receive information on a processing load from the CBC 50, or may receive the information on the processing load from the CBC 50 in receiving the distribution request. The information on the processing load, for example, may be a CPU usage rate etc. in the CBC 50. Alternatively, the gateway device 40 may receive information on a processing load of the radio base station 70, which is the distribution destination node, or the mobile management node 60, etc. through the CBC 50.

When the processing load of the CBC 50, or the radio base station 70, mobile management node 60, etc. is high, the gateway device 40 may discard the distribution request transmitted from the M2M service PF 30 without transferring it. Alternatively, when the processing load of the CBC 50 or a radio base station is high, the gateway device 40 may designate a retransmission time of the distribution request to the M2M service PF 30 and may notify the M2M service PF 30 of the designated retransmission time. Alternatively, the gateway device 40 may store the distribution request in a buffer, and may transmit the distribution request stored in the buffer to the CBC 50 after elapse of a predetermined time. As a result of this, the gateway device 40 can prevent rise of a processing load of the distribution destination node, such as the CBC 50, or the radio base station, an MME. That is, the gateway device 40 can transmit the distribution request into the core network 90 in consideration of congestion states of the core network 90 and the radio base station 70.

Furthermore, when the distribution request is transmitted from the M2M service PF 30, the gateway device 40 may execute generation processing of accounting information for charging the organizations related to the event information. For example, the gateway device 40 may notify an accounting processing device etc. that execute accounting processing in the core network 90 of identification information to identify the organizations related to the event information, and reception of the distribution request, and may generate an accounting profile. The accounting processing device, for example, may be a CDF (Charging Data Function), a CGF (Charging Gateway Function), etc that are arranged in a network prescribed in the 3GPP.

The CBC 50 transmits a distribution request to the mobile management node 60 based on the distribution destination node information that the gateway device 40 notified of. The mobile management node 60 of a distribution destination may be designated in the distribution destination node information. Alternatively, when the radio base station 70 of the distribution destination is designated in the distribution destination node information, the CBC 50 may extract the mobile management node 60 connected to the designated radio base station 70. In this case, the CBC 50 may manage the mobile management node 60 and the radio base station 70 using an information table etc.

The mobile management node 60 receives the distribution request transmitted from the CBC 50. For example, the mobile management node 60 may be an MME (Mobility Management Entity), which is a node of a core network prescribed in the 3GPP. The mobile management node 60 may be arranged in a network in a prefecture unit or in a district unit smaller than prefectures.

The mobile management node 60 transmits event information included in the received distribution request to the plurality of radio base stations 70 connected to the mobile management node 60. The mobile management node 60 may transmit the received event information to all the radio base stations 70 connected thereto. Alternatively, when the radio base station 70 of the distribution destination is designated by the CBC 50, the mobile management node 60 may transmit the received event information to the designated radio base station 70.

The radio base station 70 receives the event information transmitted from the mobile management node 60. The radio base station 70 transmits the received event information to the mobile terminal 80 belonging to an area managed by the radio base station 70.

The mobile terminals 80 may be a cellular phone terminal, a smartphone terminal, a notebook type personal computer, etc., may be movement means in which a communication function is mounted in an automobile, a train, etc., or may be a machine having the communication function mounted therein, the machine being worn like a watch by a user. Alternatively, the mobile terminal 80 may be a device that is not frequently moved, and is controlled through a radio line, such as a vending machine having the communication function mounted therein.

In addition, although in the above explanation it has been explained that the gateway device 40 and the CBC 50 are different devices, for example, a function achieved in the gateway device 40 may be the same as a function achieved in the CBC 50. That is, the gateway device 40 and the CBC 50 may be arranged in the core network 90 as an integrated device. In addition, when the gateway device 40 and the CBC 50 are different devices, the CBC 50 may decide the distribution destination node based on the distribution region information.

Next, configuration examples of an SCS 40A and an MTC IWF 40B in accordance with the embodiment 1 of the present invention will be explained using FIGS. 3A and 3B. The SCS 40A of FIG. 3A includes a service PF interface 41 and a control unit 43. In addition, the SCS 40A may be referred to as an MTC Server.

The service PF interface 41 is used to communicate with the M2M service PF 30, and transmits data to and receives data from the M2M service PF 30. The service PF interface 41 receives a distribution request including event information and distribution region information from the M2M service PF 30. The service PF interface 41 outputs the distribution request to the control unit 43.

The control unit 43 transmits to the MTC IWF 40B the event information and the distribution region information that are output from the service PF interface 41.

Subsequently, the configuration example of the MTC IWF 40B of FIG. 3B will be explained. The MTC IWF 40B includes: a notification unit 44; an NW configuration information DB 45; and a CBC interface 42. The notification unit 44 receives distribution region information and event information from the SCS 40A. The notification unit 44 specifies a distribution destination node based on the distribution region information transmitted from the SCS 40A. The notification unit 44 specifies the distribution destination node using the NW configuration information DB 45. The notification unit 44 transmits a distribution request including the event information output from the control unit 43 of the SCS 40A, and the specified distribution destination node information to the CBC 50 through the CBC interface 42.

The CBC interface 42 is used to communicate with the CBC 50, and transmits data to and receives data from the CBC 50.

Here, a configuration example of the NW configuration information DB 45 will be explained using FIG. 4. The NW configuration information DB 45 manages region information and base stations belonging to the region while associating them with each other. For example, a region A is associated with an eNB#1, an eNB#2, and an eNB#3 as base stations belonging to the region A. Furthermore, a region B is associated with an eNB#4, an eNB#5, and an eNB#6 as base stations belonging to the region B. Furthermore, a region C is associated with an eNB#7 and an eNB#8 as base stations belonging to the region C. The region C, for example, may be designated as a region along the National Route X. In addition to that, a range of several kilometers on the highway, etc. may be designated as the region information.

An eNB is a title of a radio base station used in LTE prescribed in the 3GPP. Although the base stations are explained using the eNBs in FIG. 4, radio base stations used in a communication scheme different from the LTE, such as radio base stations used in a W-CDMA radio scheme, and region information may be associated with each other.

In addition, although in FIG. 4, the example has been explained where the region information and the base stations are managed while being associated with each other, for example, the region information and a node in the core network, such as a mobile management node, may be managed while being associated with each other. In addition, the region information, and the node and the base stations in the core network may be managed while being associated with each other.

Next, using FIG. 5, a sequence showing a flow of signals of the information distribution system between the M2M service PF 30 and the CBC 50 in accordance with the embodiment 1 of the present invention will be explained. First, the M2M service PF 30 receives event information such as natural disasters, such as an earthquake and tsunami, a fire, a traffic accident, a crime, and information on a location where the event has occurred through computers arranged in respective organizations of a government agency, a police station, or a fire station, etc (S11).

Next, the M2M service PF 30 transmits to the SCS 40A a distribution request including the event information and information on a distribution region (S12). The SCS 40A receives the distribution request transmitted from the M2M service PF 30, and transmits the received distribution request to the MTC IWF 40B (S13). Here, in FIG. 5, it is explained that the SCS 40A and the MTC IWF 40B are different devices. Conforming to a standard in which the SCS 40A and the MTC IWF 40B are arranged as different devices in a network configuration prescribed in the 3GPP, it is also explained in FIG. 5 that the SCS 40A and the MTC IWF 40B are different devices also in FIG. 5.

An intermediate between the SCS 40A and the MTC IWF 40B is defined as a Tsp IF in the 3GPP. The SCS 40A sets an AVP (Attribute Value Pair) that designates distribution area information to a Device-Action-Request of the Tsp IF as a distribution request, and transmits it to the MTC IWF 40B. The AVP set to the Device-Action-Request of the TSP IF is a Distribution-Area indicating information to specify a distribution area. Furthermore, a Type and an option are set to the Distribution-Area.

The option includes information on an area ID, a GPS, a terminal (IMSI), a distribution policy, or movement characteristics, etc. The area ID is, for example, an ID made to correspond to address information. A network operator may define the area ID. The GPS, for example, may be location information indicating a designated location, when distributing information to a range of X (X is an arbitrary numeric character) km radius of the designated location is set as a distribution policy. The IMSI may be information to identify a designated terminal, when distributing information to a range of X km radius centering on the designated terminal is set as the distribution policy.

The Type includes information on whether to designate the area ID, the GPS, or the IMSI in order to designate the distribution area. For example, a case where designating the GPS to the Type is set, it indicates distributing information to a terminal within a range of X km radius of location information, notification of which is performed as GPS information.

The MTC IWF 40B specifies the distribution destination node based on the distribution region information. Specification of the distribution destination node is performed using the NW configuration information DB 45 as mentioned above. The MTC IWF 40B transmits information on the specified distribution destination node to the CBC 50 together with event information (S14).

Here, for example, when the area ID is designated to the Type of the Device-Action-Request, the MTC IWF 40B specifies an MME or a cell associated with the area ID. When the GPS is designated to the Type of the Device-Action-Request, the MTC IWF 40B specifies an MME or an eNB arranged within a range of X km around latitude and longitude information, notification of which is performed as the GPS information. When a fixed terminal IMSI that does not move, such as a vending machine is designated to the Type of the Device-Action-Request, the MTC IWF 40B specifies an MME or a cell arranged within a range of X km around the fixed terminal. As described above, when the GPS or the fixed terminal IMSI is designated to the Type of the Device-Action-Request, a distribution policy indicating a distribution destination area in a range of X km radius etc. is set in the option. When a moving terminal IMSI, such as an emergency vehicle is designated to the Type of the Device-Action-Request, the MTC IWF 40B specifies a distribution destination MME or cell using movement characteristics indicating a speed etc. of the moving terminal. That is, the MTC IWF 40B specifies the MME or the cell present within a range of X km radius centering on a location of the moving terminal after elapse of a predetermined period using the movement characteristics. As described above, when the moving terminal IMSI, such as the emergency vehicle is designated to the Type of the Device-Action-Request, information on the movement characteristics is set to the option.

The information on the distribution destination node specified by the MTC IWF 40B is defined as an impacted area in the 3GPP. For example, information on a cell managed by the specified distribution destination node (cell information) may be set to the impacted area. In step S14, the MTC IWF 40B may set the impacted area to an Emergency Broadcast Request prescribed in the 3GPP, and may transmit it to the CBC 50. In addition, the CBC 50 may transmit an Emergency Broadcast Response to the MTC IWF 40B, after receiving a WRITE-REPLACE WARNING RESPONSE, which will be mentioned later.

When receiving the Emergency Broadcast Response from the CBC 50, the MTC IWF 40B may perform accounting processing, may set accounting information to a Device-Action-Answer, which is a response signal of the Device-Action-Request, and may transmit it to the SCS 40A. Here, accounting regarding information distributed using the CBC may be performed based on a distribution area, a data amount, a distribution time, the number of times of distribution, or the number of distribution destination terminals, etc. For example, an accounting rate may be changed according to the distribution area. Furthermore, a charge billing destination may not be set as the terminal received the information, but may be set as respective organizations of a government agency, a police station, or a fire station, etc. that have requested information distribution. In addition, the MTC IWF 40B can acquire information on the number of distribution destination terminals by receiving distribution result notification, which will be explained in detail in later FIG. 6B.

In addition, a technical specification prescribed by the 3GPP defines devices that transmit a Request message etc. to the CBC as CBE (Cell Broadcast Entities). Here, the MTC IWF 40B may have a function regarding the CBE in order to communicate with the CBC.

Here, in UE, the CBC 50 may be notified of information (emergency distribution reception necessary/unnecessary information) to make it determine whether or not emergently distributed information is received. For example, in the LTE, the emergency distribution reception necessary/unnecessary information may be set to a Warning Type or a Warning Message, etc. together with a disaster type etc. In addition, in a 3G, the emergency distribution reception necessary/unnecessary information may be set to a Message ID, a Serial Number, etc. together with the disaster type etc. Furthermore, the emergency distribution reception necessary/unnecessary information may be set to other parameters or messages. The emergency distribution reception necessary/unnecessary information may be included in any message transmitted in steps S12, S13, and S14.

For example, the emergency distribution reception necessary/unnecessary information may be the information to be able to determine whether or not only an MTC device should receive, or whether or not the MTC device should not receive (or should discard) it, etc. The MTC device is the device included in the UE, and is the device used for MTC defined as machine communication. The MTC and the MTC device are defined in the technical specification of the 3GPP. The CBC 50 may receive a flag indicating whether or not the information is directed to the MTC device as the emergency distribution reception necessary/unnecessary information.

Alternatively, the CBC 50 may determine that information transmitted from the MTC IWF 40B is all directed to the MTC device. In this case, the emergency distribution reception necessary/unnecessary information becomes unnecessary.

Figure 6A:
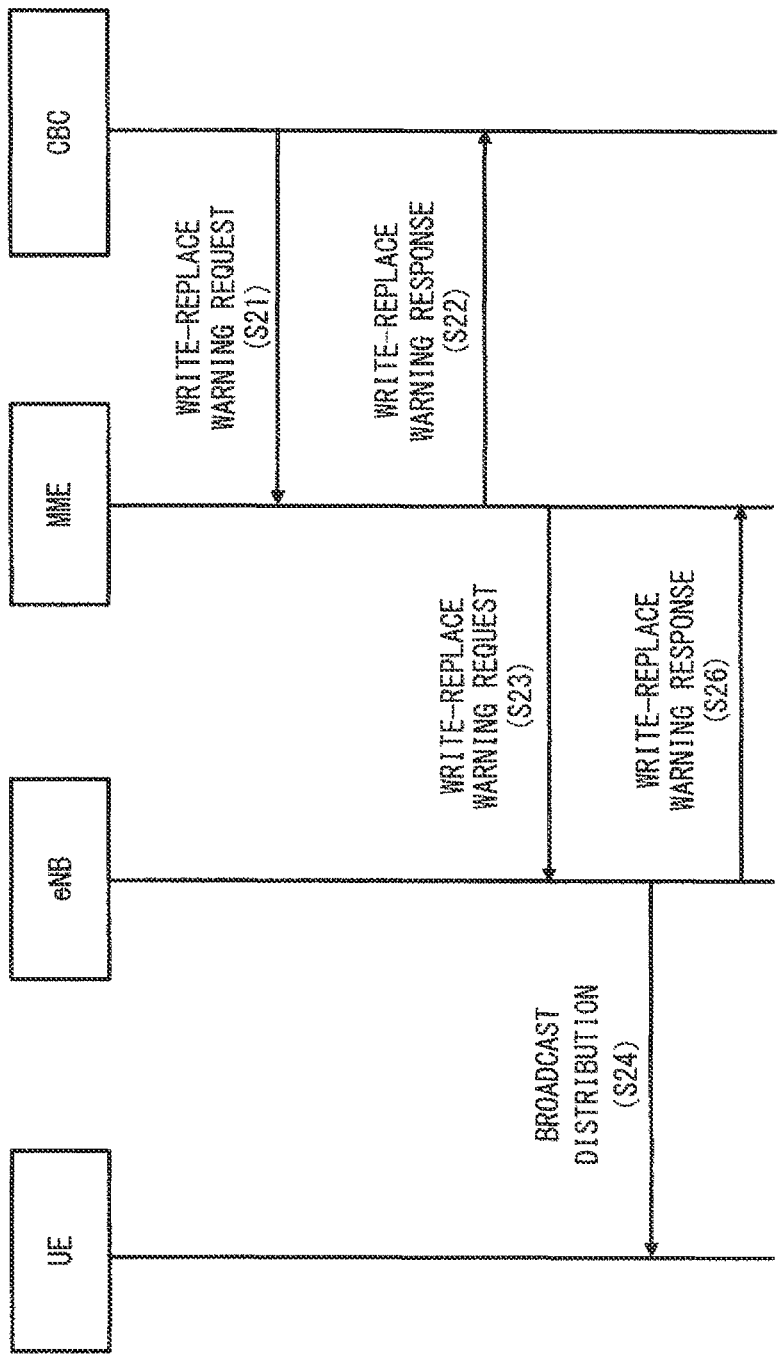
FIG. 6A is a sequence showing a flow of signals of the information distribution system in accordance with the embodiment 1.

Next, using FIG. 6A, a sequence showing a flow of signals of the information distribution system between the CBC 50 and the mobile terminal 80 will be explained. The sequence in FIG. 6A shows the flow of the signals in a network prescribed in the 3GPP. Information distribution between the CBC 50 and the mobile terminal 80 is performed using an emergency information distribution system.

Figure 5:
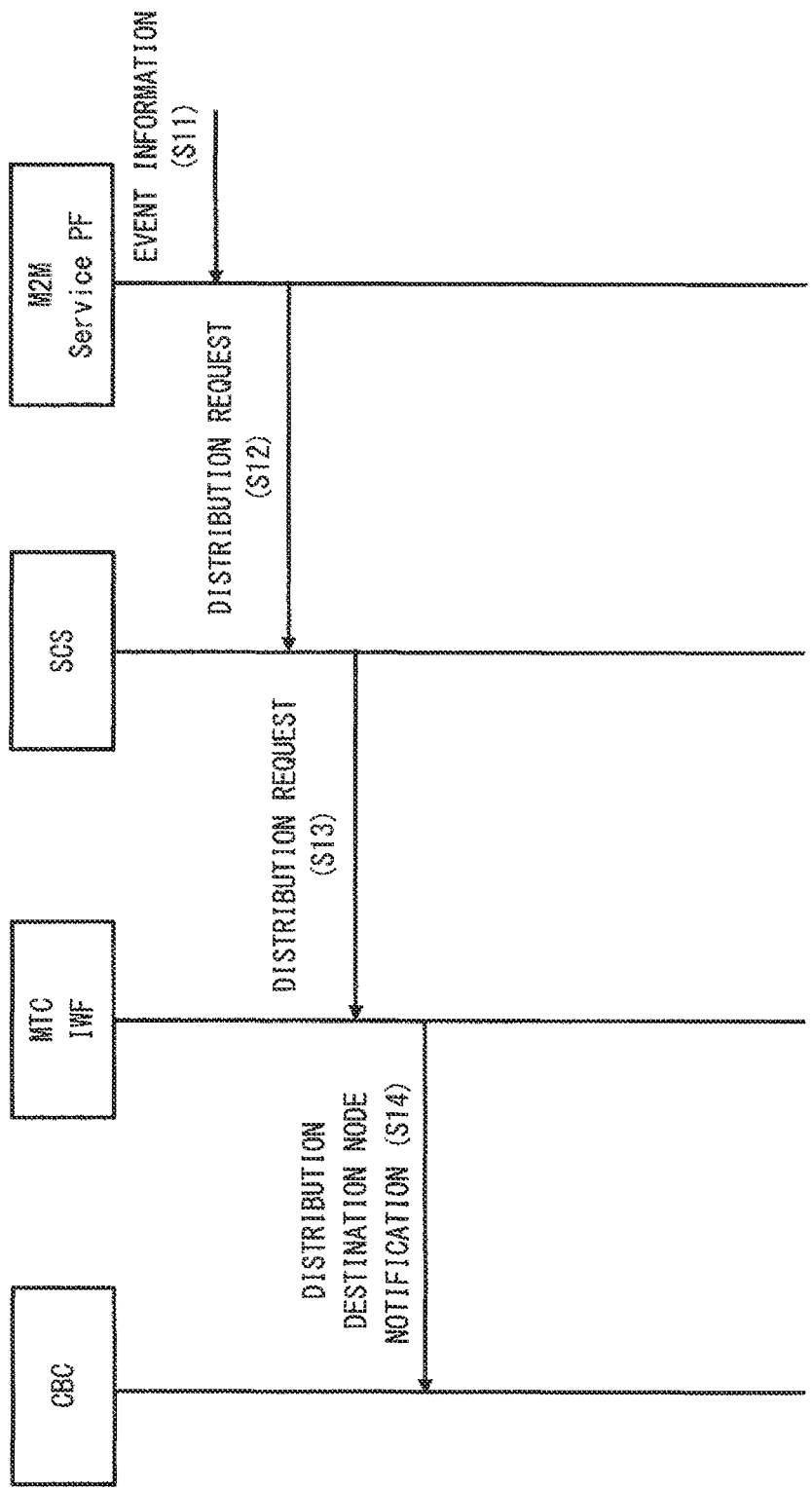
FIG. 5 is a sequence showing a flow of signals of the information distribution system in accordance with the embodiment 1.

First, when the CBC 50 is notified of the distribution destination node in step S14 of FIG. 5, it transmits a WRITE-REPLACE WARNING REQUEST to the MME (S21). TAI, a Warning Area List, an Extended Repetition Period, a Warning Type, Warning Message Contents, etc. are included in the WRITE-REPLACE WARNING REQUEST. The TAI is an abbreviated name of Tracking Area Identity indicating a location registration area. When the TAI is included in the WRITE-REPLACE WARNING REQUEST, the MME performs information distribution to a cell or a base station belonging to the same TAI. For example, the CBC 50 sets to the Warning Type or the Warning Message information (a flag) on whether or not the information is directed to the MTC device.

Next, when the MME receives the WRITE-REPLACE WARNING REQUEST, it a WRITE-REPLACE WARNING RESPONSE to the CBC 50 as a response signal (S22). Next, when the MME receives the TAI in step S21, it transmits the WRITE-REPLACE WARNING REQUEST to an eNB belonging to the received TAI (S23). Here, in step S21, when the MME does not receive the TAI, it may transmit the WRITE-REPLACE WARNING REQUEST to all eNBs under management of the MME.

Next, the eNB broadcasts and distributes information set to the WRITE-REPLACE WARNING REQUEST to a plurality of UE under management of the eNB (S24). Here, in the ETWS of the LTE, a first report (paging) of emergency distribution called primary notification is sent, and after that, detailed information is transmitted by a second report called secondary notification. For example, the UE can determine whether or not the transmitted broadcast distribution is addressed to its own device by including the emergency distribution reception necessary/unnecessary information in the first report. When the emergency reception necessary/unnecessary information indicating that the information is directed to the MTC device is set to the first report, the UE, which is not the MTC device, determines that the broadcast distribution is not addressed to its own device. In this case, the UE, which is not the MTC device, can discard the detailed information of the second report. In addition, when the emergency reception necessary/unnecessary information indicating that the information is not directed to the MTC device is set to the first report, the MTC device determines that the broadcast distribution is not addressed to its own device. In this case, the MTC device can discard the detailed information of the second report. For the reason described above, it becomes unnecessary for the MTC device and the UE, which is not the MTC device, to perform unnecessary data processing, and to wastefully use a resource for performing the data processing.

Next, the eNB transmits the WRITE-REPLACE WARNING RESPONSE to the MME as a response signal (S26).

Here, in step S23, the MME may set to the WRITE-REPLACE WARNING REQUEST information on a terminal type to specify a distribution destination terminal. In this case, the eNB also includes the information on the terminal type in data to be broadcast and distributed. When the UE receives the information on the terminal type, it determines whether or not the data transmitted by the broadcast distribution is the data transmitted to its own device. For the reason described above, it becomes unnecessary for the UE to perform reception processing of the data that is not transmitted to its own device, and thus a processing burden can be reduced.

Next, a flow of distribution result notification processing after end of the broadcast distribution will be explained using FIG. 6B. When the eNB performs the broadcast distribution in step S24 of FIG. 6A, it transmits a distribution result notification to the MME (S101). The distribution result notification includes information indicating that the broadcast distribution to the plurality of UE has been executed, and information on the number of UEs to which data has been distributed. For example, the eNB may specify the number of UEs to which the data has been distributed by counting the number of response messages transmitted from the UE that has received the data in the broadcast distribution.

Next, the MME transmits the received distribution result notification to the CBC 50 (S102). Furthermore, the CBC 50 transmits the received distribution result notification to the MTC IWF 40B (S103). In steps S102 and S103, the distribution result notification includes the information indicating that the broadcast distribution to the plurality of UE has been executed, and the information on the number of UE to which the data has been distributed similarly to step S101.

Next, the MTC IWF 40B transmits to the SCS 40A the distribution result notification including the information indicating that the broadcast distribution to the plurality of UE (S104) has been executed. Here, the MTC IWF 40B sets to a Device-Notification-Request of the Tsp IF an AVP that designates the information indicating that the broadcast distribution to the plurality of UE has been executed, and transmits it to the MTC IWF 40B. The AVP set to the Device-Notification-Request, for example, may be a Report AVP.

Next, the SCS 40A transmits the received distribution result notification to the M2M service PF 30 (S105). Furthermore, the SCS 40A transmits a distribution result response to the MTC IWF 40B as a response signal to the distribution result notification (S106). Here, the SCS 40A may use a Device-Notification-Answer of the Tsp IF as the distribution result response.

As explained above, events in accordance with a government agency, a police station, a fire station, and other organizations can be detected by using the M2M service PF 30 in accordance with the embodiment 1 of the present invention. That is, event information can be distributed according to requests from a plurality of organizations, such as the government agency, the police station, the fire station, and other organizations by using the information distribution system in accordance with the embodiment 1 of the present invention.

Furthermore, the distribution destination node can be decided for each event information by using the NW configuration information DB 45 in the gateway device 40. As a result of this, since the distribution region can be arbitrarily decided for each plurality of organizations, such as the government agency, the police station, the fire station, and other organizations, necessary information can be transmitted to a region needing the information.

Furthermore, event information can be distributed to the mobile terminal 80 using an existing emergency information distribution system by using the CBC 50. As a result of this, it is not necessary to construct a new network, and increase in cost accompanying the distribution of the event information can be prevented.

(Embodiment 2)

Subsequently, a configuration example of an SCS 40A_1 in accordance with an embodiment 2 of the present invention will be explained using FIG. 7. The SCS 40A_1 includes: the service PF interface 41; the control unit 43; and a priority information DB 46. Since configurations other than the priority information DB 46 are similar to FIG. 3A, detailed explanations thereof are omitted. In addition, although the configuration in which the SCS 40A_1 has the priority information DB 46 is explained in FIG. 7, the MTC IWF 40B may have the priority information DB 46.

The priority information DB 46 prescribes a priority for each government agency, police station, fire station, and other organization. That is, in a case where notification of event information etc. is simultaneously performed by the plurality of organizations among the government agency, the police station, the fire station, and other organizations, the priority is set in the priority information DB 46 in order to process the event information etc. from the organizations to which high priorities have been set so as to preferentially distribute the event information to the organizations. Here, the case where notification of the event information etc. is simultaneously performed includes a case where notification of the plurality of event information etc. is performed within a predetermined time. For example, the case where notification of the event information etc. is simultaneously performed also includes a case where notification of the plurality of event information is performed in order in several seconds.

Here, a configuration example of the priority information DB 46 will be explained using FIG. 8A. The priority information DB 46 includes information on business operators and information on priorities. The business operators are, for example, a government agency, a police station, a fire station, and other organizations, and are set as business operators A to C in FIG. 8A. As for the priorities, for example, a priority_1 to a priority_3 are set. The priority_1 is the highest priority, and the priority becomes lower as a numeric character becomes larger. As a matter of course, it may be set that a larger numeric character has a higher priority, and that the priority becomes lower as the numeric character becomes smaller. In FIG. 8A, the priority_1 is set for the business operator A, the priority_2 for the business operator B, and the priority_3 for the business operator C. That is, the business operator A has the highest priority, and the business operator C has the lowest priority.

In addition, a different configuration example of the priority information DB 46 of FIG. 8A will be explained using FIG. 8B. In the priority information DB 46 in FIG. 8B, a service purpose and a priority are associated with each other. For example, disaster information, security information, medical information, traffic information, power information, weather information, an advertisement, a test, etc. are set to the service purposes in accordance with a priority order. In addition, the disaster information set to have a high priority is that, for example, regarding an earthquake, a tsunami, a fire, thunder, a flood, a tornado, etc. Specific information on other service purposes is as shown in FIG. 8B.

Subsequently, using FIG. 9A, a sequence showing a flow of signals of an information distribution system between the M2M service PF 30 and the CBC 50 in accordance with the embodiment 2 of the present invention will be explained. First, the M2M service PF 30 is notified of event information 1 by the business operator A (S31). Next, the M2M service PF 30 notifies the SCS 40A_1 of a distribution request 1 (S32). Similarly, when notified of event information 2 by the business operator B (S33), the M2M service PF 30 notifies the SCS 40A_1 of a distribution request 2 (S34), and when notified of event information 3 by the business operator (S35), the M2M service PF 30 notifies the SCS 40A_1 of a distribution request 3 (S36). Identifiers of the business operators are included in the distribution requests 1 to 3.

Next, when the SCS 40A_1 receives the distribution requests 1 to 3 within a predetermined time, it performs priority determination of the respective distribution requests (S37). The SCS 40A_1 performs priority determination using the priority information DB 46. When based on FIG. 8A, the distribution request 1 including event information from the business operator A has the highest priority. Therefore, the SCS 40A_1 transmits the distribution request 1 to the MTC IWF 40B (S38). Since processing of step S39 is similar to that of step S14 in FIG. 5, an explanation thereof is omitted.

Here, in step S37, the SCS 40A_1 may discard the distribution requests 2 and 3 but not the distribution request 1 that the MTC IWF 40B is notified of. In this case, the SCS 40A_1 may notify the respective business operators that it has discarded the distribution requests through the M2M service PF 30, and may make a retransmission request to notify the business operators of the event information again after elapse of a predetermined time. Alternatively, in step S37, the SCS 40A_1 may store the distribution requests 2 and 3 in a buffer, may transmit the distribution request 2 to the MTC IWF 40B after elapse of a predetermined time, and may transmit the distribution request 3 to the MTC IWF 40B after further elapse of a predetermined period. That is, the SCS 40A_1 may transmit the distribution requests in accordance with a priority order at a constant time interval.

Figure 9A:
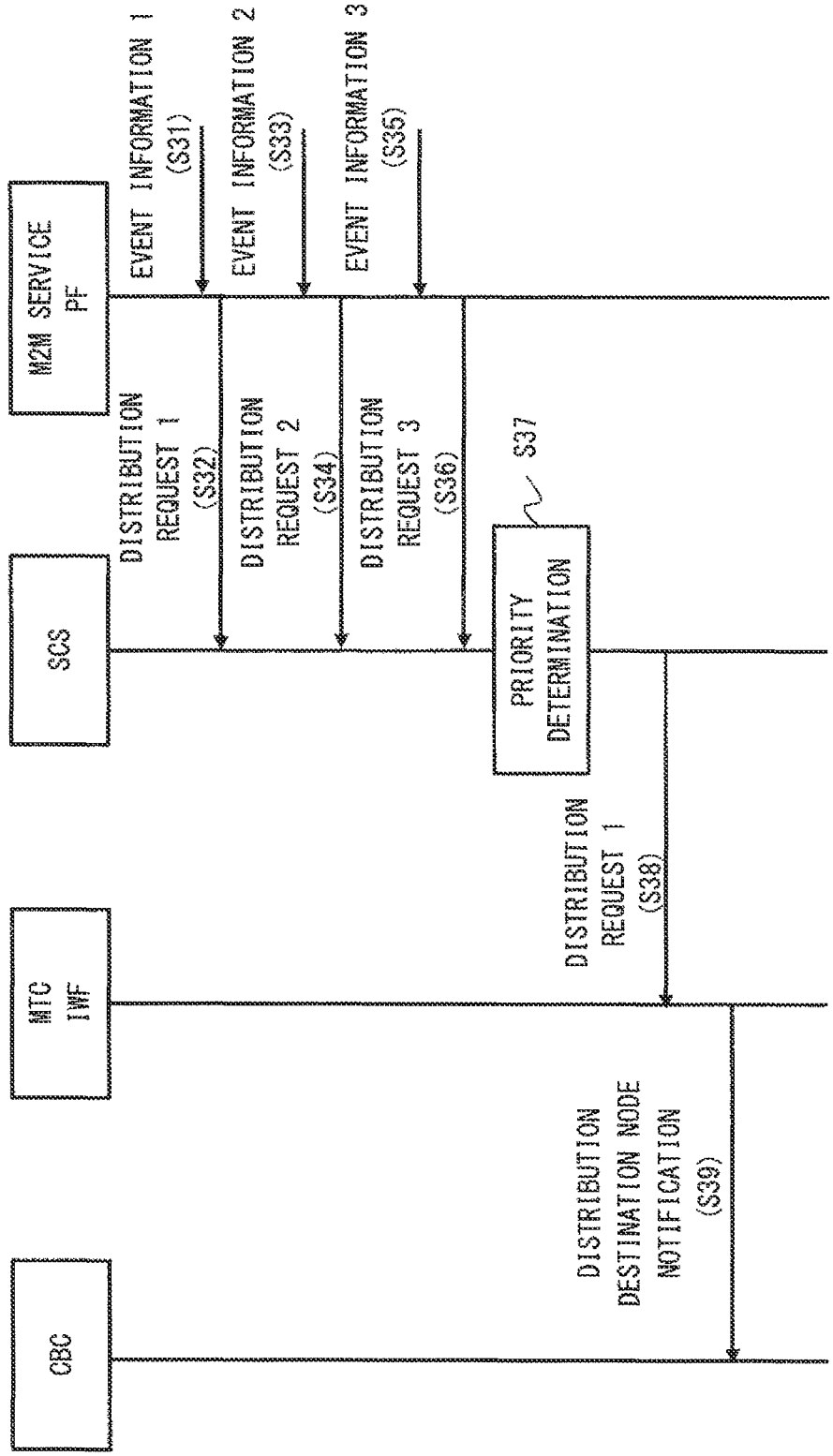
FIG. 9A is a sequence showing a flow of signals of an information distribution system in accordance with the embodiment 2.

Although a case has been explained in FIG. 9A where the SCS 40A_1 receives the event information of the plurality of business operators from one M2M service PF 30, the present invention can be similarly applied, for example, also to a case where the SCS 40A_1 receives the event information of the plurality of business operators from the plurality of M2M service PFs 30.

Next, a flow of processing when the MTC IWF 40B performs priority determination processing will be explained using FIG. 9B. Since steps S31 to S36, and step S39 are similar to those of FIG. 9A, detailed explanations thereof are omitted.

When the SCS 40A-1 receives the distribution requests in steps S32, S34, and S36, it transmits a service purpose notification to the MTC IWF 40B (S61 to S63). The service purpose notification, for example, includes information on the service purposes explained in FIG. 8B. In addition, the SCS 40A___1 may set an AVP (Attribute Value Pair) indicating the information on the service purposes to the Device-Action-Request of the Tsp IF, and may transmit it to the MTC IWF 40B. As the AVP indicating the information on the service purposes, for example, an AVP set as a Service may be newly defined in the 3GPP.

Next, the MTC IWF 40B performs priority determination (S64). When the MTC IWF 40B receives the information on the service purposes from the SCS 40A_1, it determines the priorities of the received service purposes based on the priority information DB 46 shown in FIG. 8B. Since subsequent processing is similar to that of FIG. 9A, a detailed explanation thereof is omitted.

Figure 9B:
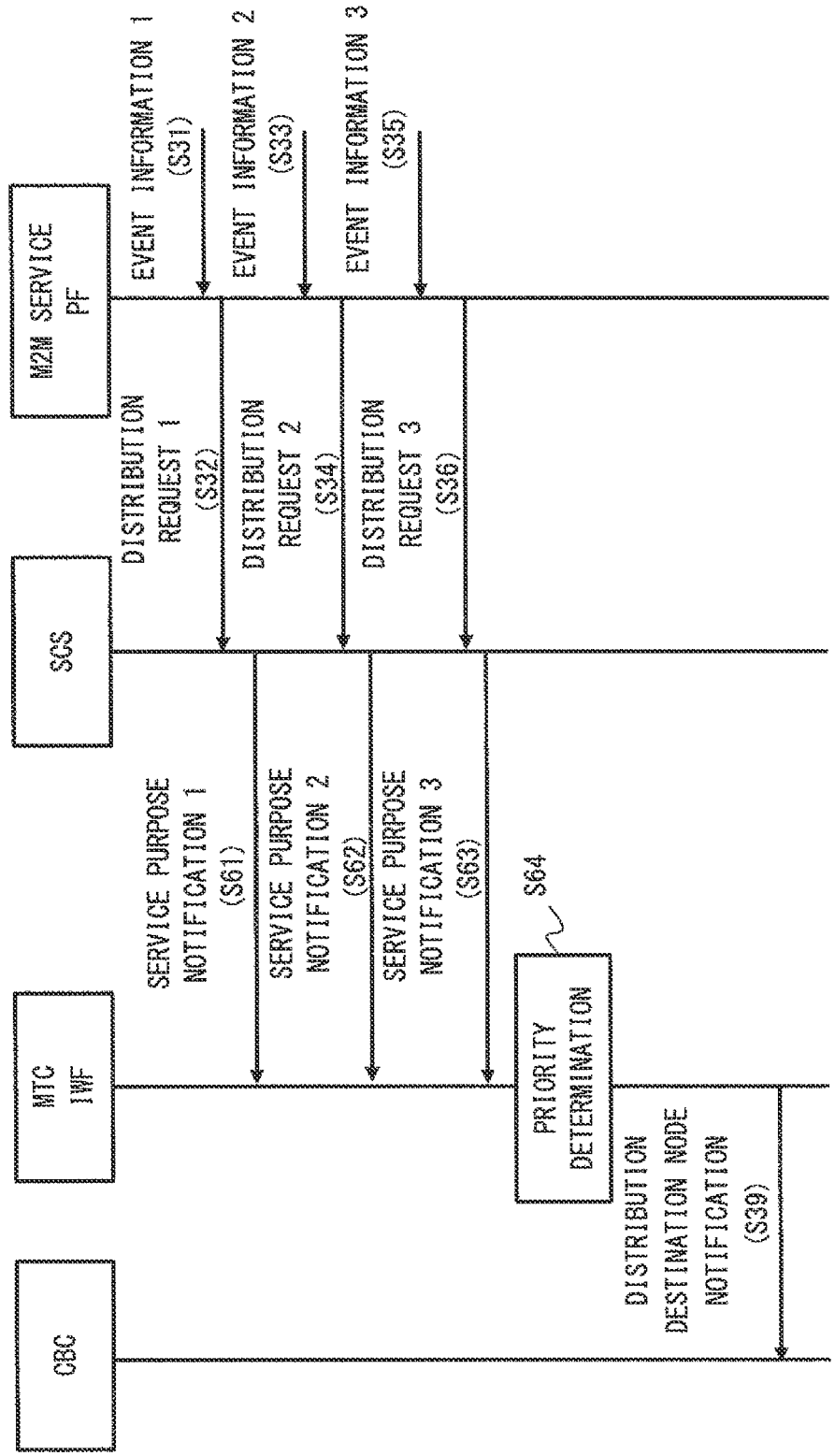
FIG. 9B is a sequence showing a flow of signals of the information distribution system in accordance with the embodiment 2.

Here, in FIGS. 9A and 9B, the MTC IWF 40B notifies the CBC 50 of a distribution destination node using an Emergency Broadcast Request prescribed in the 3GPP. The Emergency Broadcast Request may have further information on the priorities determined in the MTC IWF 40B. Furthermore, the CBC 50 may transmit to the MME the WRITE-REPLACE WARNING REQUEST explained in FIG. 6A including the information on the priorities therein.

Subsequently, another example when the M2M service PF 30 notifies of a plurality of distribution requests will be explained using FIG. 10. Since steps S41 to S46 are similar to steps S31 to S36 of FIG. 9, explanations thereof are omitted. In steps S42, S44, and S46, when the SCS 40A_1 receives a plurality of distribution requests within a predetermined time, it collects the plurality of distribution requests to generate one distribution request message, and notifies the MTC IWF 40B of the generated one distribution request message (S47). The one distribution request message includes distribution region information and event information on the respective distribution requests 1 to 3.

Next, the MTC IWF 40B specifies a distribution destination node for each distribution request, and notifies the CBC 50 of the specified distribution destination node (S48).

As explained above, by using the SCS 40A_1 in accordance with the embodiment 2 of the present invention, event information can be distributed based on the order of priority, when the plurality of distribution requests are received within the predetermined time. As a result of this, for example, an emergency message having a high priority, etc. can also be processed more preferentially than the other event information, and necessary information can be reliably distributed.

Figure 10:
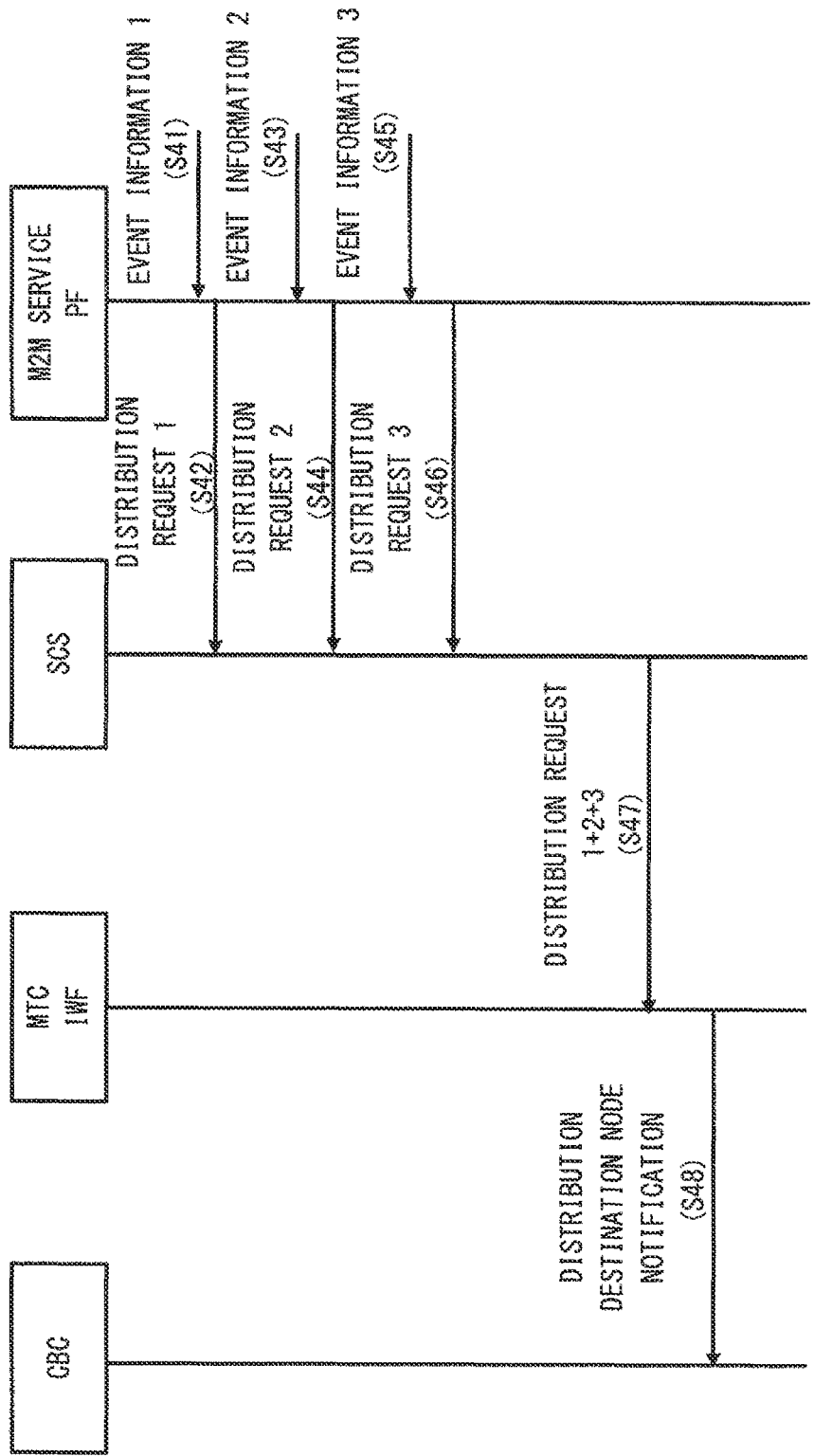
FIG. 10 is a sequence showing a flow of signals of the information distribution system in accordance with the embodiment 2.

In addition, as explained in FIG. 10, the SCS 40A_1 collects the plurality of distribution requests 1 to 3 to generate one new distribution request with respect to the MTC IWF 40B, and thereby it can collectively process the plurality of distribution requests. As a result of this, the distribution requests received from the M2M service PF 30 can be distributed without being discarded, etc.

(Embodiment 3)

Subsequently, a configuration example of an SCS 40A_2 in accordance with an embodiment 3 of the present invention will be explained using FIG. 11. The SCS 40A_2 includes: the service PF interface 41; the control unit 43; and a data format information DB 47. Since configurations other than the data format information DB 47 are similar to those of FIG. 3A, detailed explanations thereof are omitted.

The data format information DB 47 manages a distribution content and a data format of the distribution content while associating them with each other. Here, a configuration example of the data format information DB 47 will be explained using FIG. 12. As mentioned above, the data format information DB 47 manages the distribution content and the data format while associating them with each other. For example, when character information is distributed, it is distributed using a text message as the data format. Furthermore, when route information is distributed, it is distributed using map data as the data format. Furthermore, when operation of a device, such as a mobile communication device of a distribution destination, is controlled, a device control signal is distributed as the data format. For example, the route information is used when vehicles etc. that pass around a route through which an emergency vehicle passes from an accident scene to a hospital etc. are notified of the route etc. For example, control of device operation may be ON/OFF operation of a power source of the device, etc.

Returning to FIG. 11, when the control unit 43 receives a distribution request from the service PF interface 41, it extracts a distribution content of event information set to the distribution request. The control unit 43 specifies a data format corresponding to the distribution content using the data format information DB 47. The control unit 43 notifies the notification unit 44 of the MTC IWF 40B of information on the specified data format.

As explained above, in the SCS 40A_2 in accordance with the embodiment 3 of the present invention, not only the character information but also various other kinds of information can be distributed by using the data format information DB 47. Image information and moving image information may be prescribed in addition to the contents shown in FIG. 12.

Figure 3A:
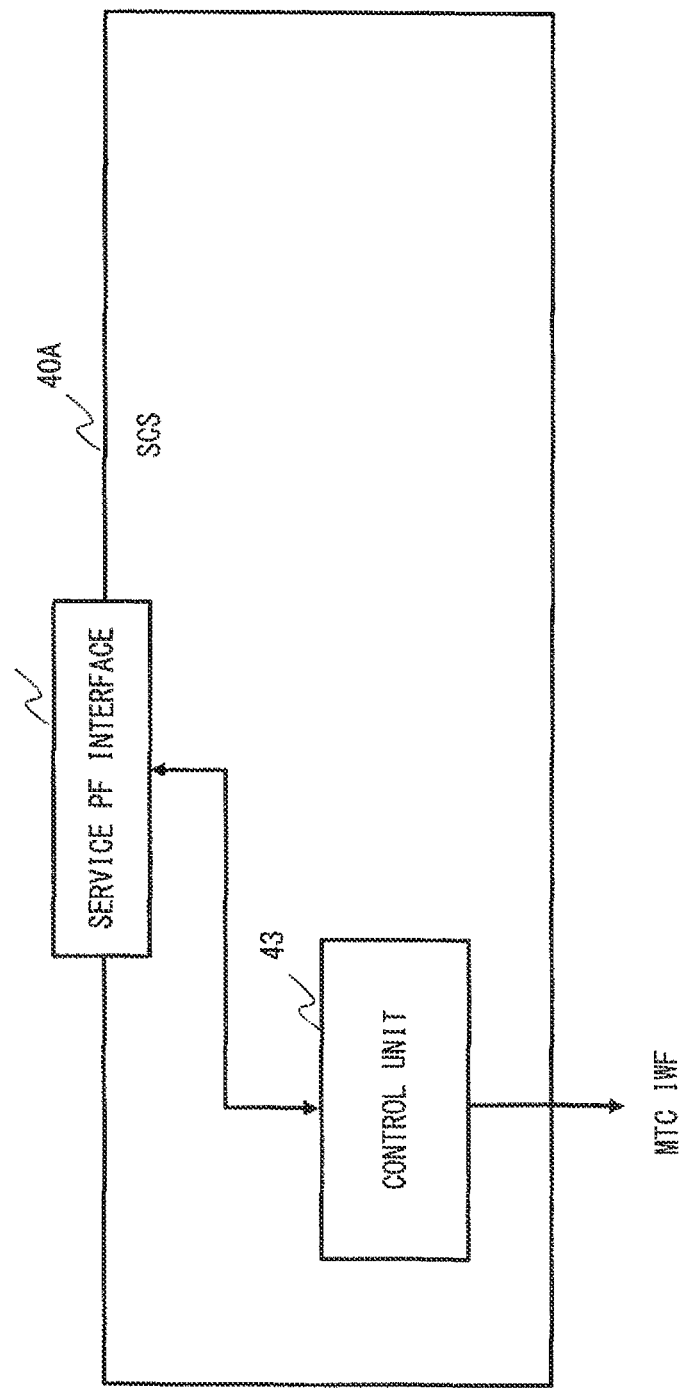
FIG. 3A is a configuration diagram of an SCS in accordance with the embodiment 1.
Figure 3B:
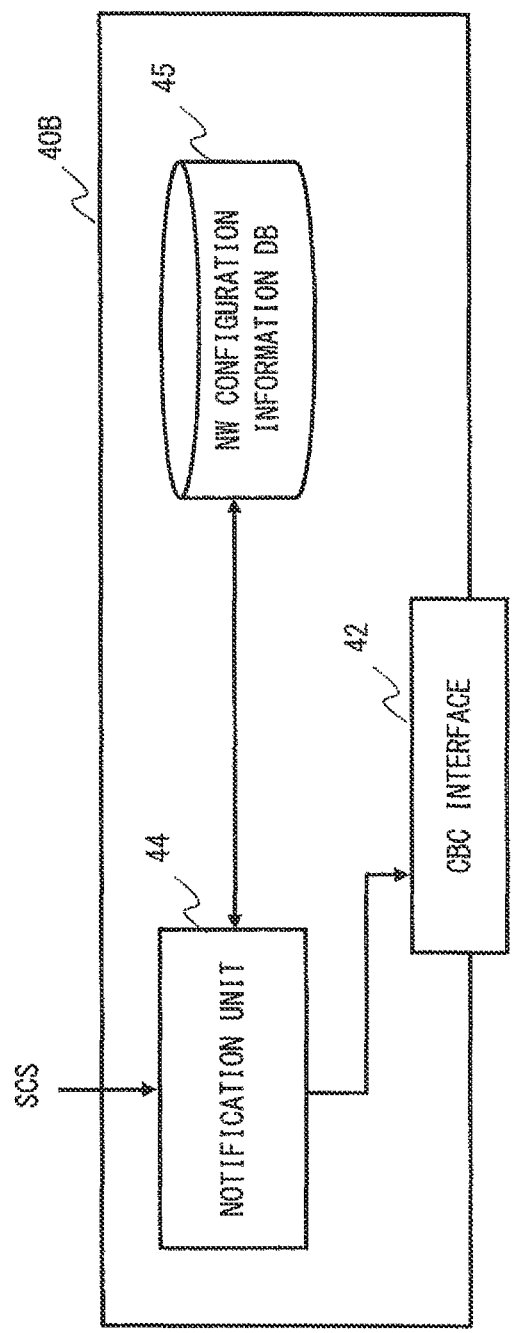
FIG. 3B is a configuration diagram of an MTC IWF in accordance with the embodiment 1.
Figure 7:
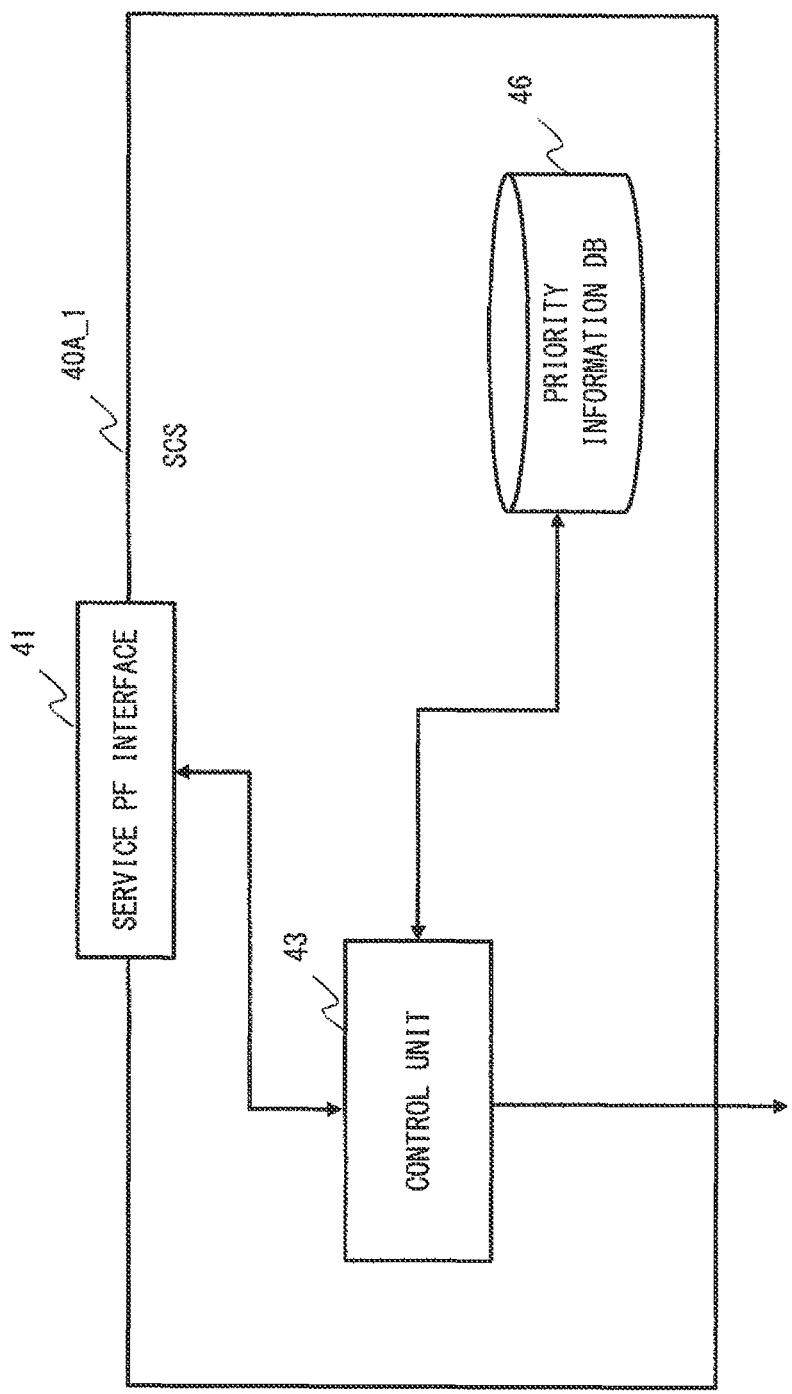
FIG. 7 is a configuration diagram of an SCS in accordance with an embodiment 2.
Figure 11:
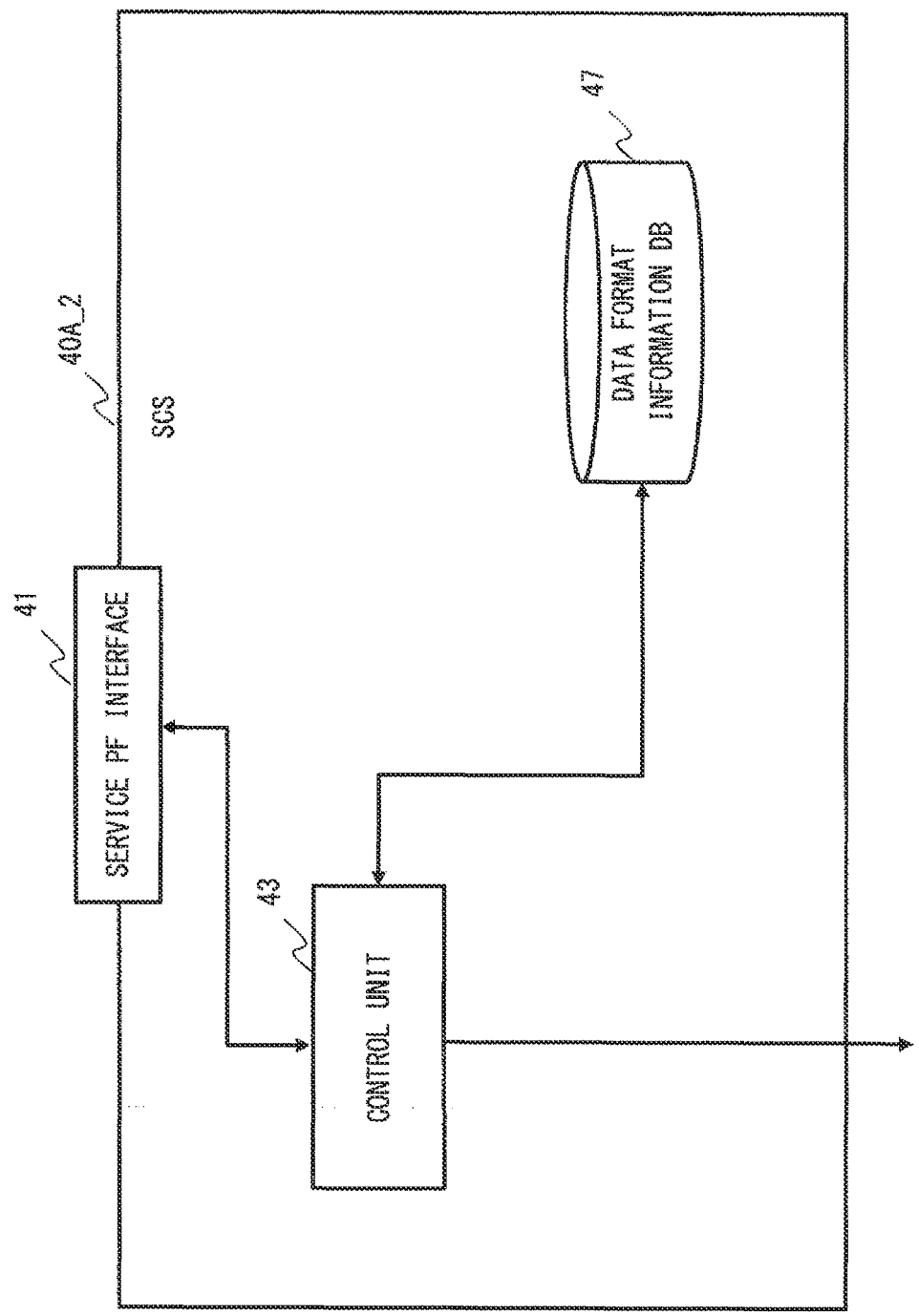
FIG. 11 is a configuration diagram of an SCS in accordance with an embodiment 3.

In addition, although in FIG. 11, the configuration has been explained in which the data format information DB 47 is added to the configuration of the SCS 40 of FIG. 3A, a configuration can be employed in which the data format information DB 47 is added to the configuration of the SCS 40A_1 of FIG. 7.

(Embodiment 4)

Figure 13:
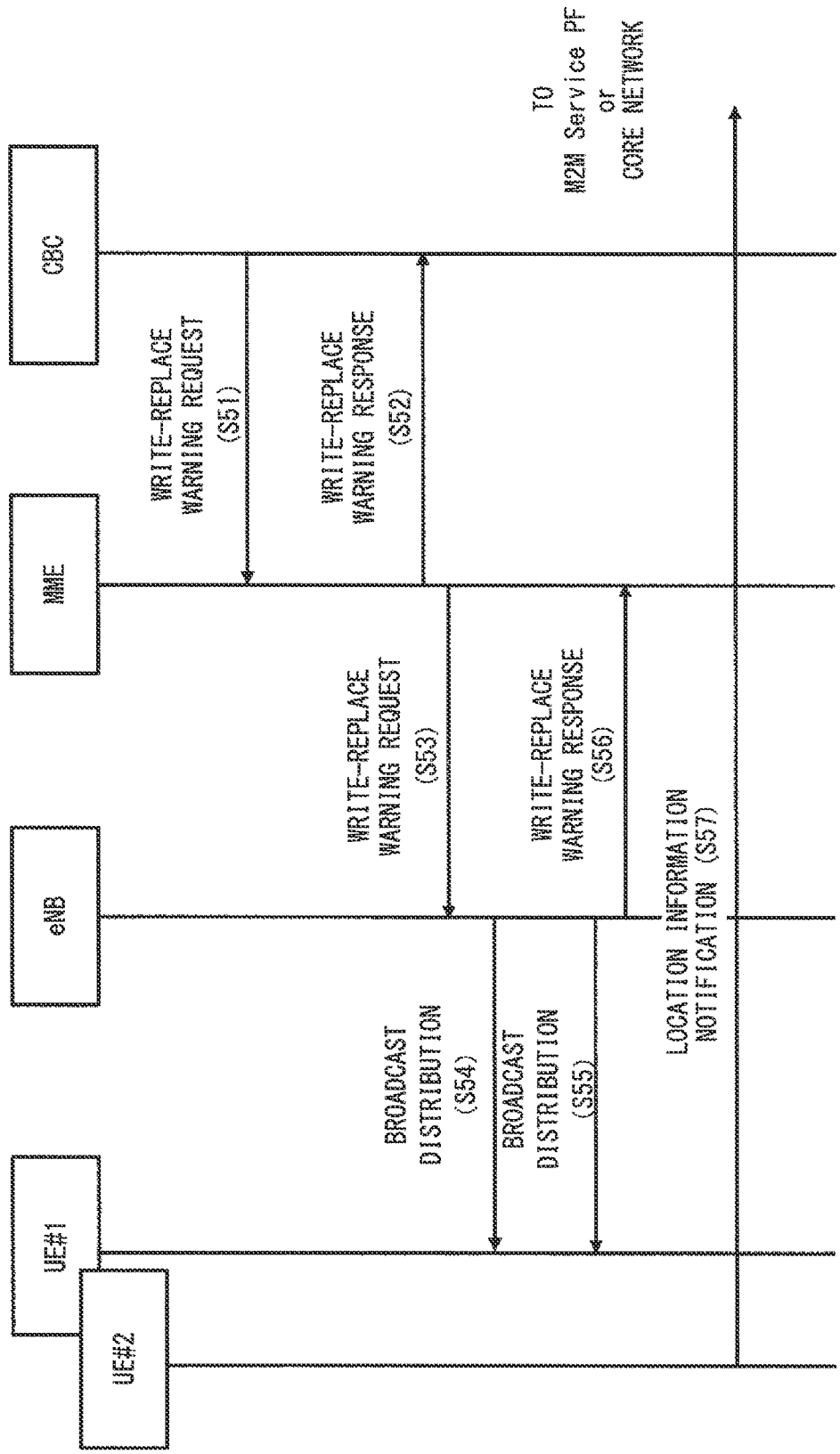
FIG. 13 is a sequence showing a flow of signals of an information distribution system in accordance with an embodiment 4.

Next, using FIG. 13, a sequence showing a flow of signals of an information distribution system between the CBC 50 and the mobile terminal 80 in accordance with an embodiment 4 of the present invention will be explained. Using FIG. 13, a flow of processing in a case where an information distribution area changes in a short time as in a case of distributing information within a peripheral range of several kilometers centering on a point where a moving emergency vehicle is located will be explained. Since processing of steps S51 to S56 is similar to that of steps S21 to S26 in FIG. 6, a detailed explanation thereof is omitted.

UE#1 is assumed to be a terminal that is present within the range of several kilometers around the emergency vehicle, and that receives broadcast distribution. UE#2 is assumed to be a terminal mounted in the emergency vehicle. Here, after step S55, a location information notification is transmitted from the UE#2, which is the emergency vehicle, to the M2M service PF 30 in order to notify about a change of location information (S57). When the location information of the UE#2 is changed, the M2M service PF 30 sets new distribution region information, and notifies the SCS 40 of it. Hereinafter, processing of FIG. 5 is repeated.

In addition, the UE#2 may notify an MME or an HSS (subscriber information management device), etc., which are devices that manage location information in the core network 90, of the location information to notify of the change of the location information (S57). When location information is changed by the mobile communication device of the UE#2 etc., the MME or the HSS, etc. in the core network 90 are updated, and the newest location information is recorded. The CBC 50 may receive the newest location information of the UE#2 from the MME or the HSS, etc., and may decide the distribution destination node of the event information.

As explained above, the following effects can be obtained by using the information distribution system in accordance with the embodiment 4 of the present invention. The M2M service PF 30 receives the location information of the mobile communication device serving as a center location of information distribution, and thereby the distribution region can be changed according to the received location information. As a result of this, the information distribution area can be changed in a short time. In addition, the CBC 50 receives the newest location information of the mobile communication device serving as the center location of the information distribution from the device in the core network, such as the MME and the HSS, and for this reason also the information distribution area can be changed in a short time.

When the M2M service PF 30 receives the location information from the UE#2, the following effects are also produced. For example, there is a case where the UE#2 transitions to an Idle mode, and where a connection state of a physical link with the eNB etc. is released. In such case, when the location information of the UE#2 is changed, the MME or the HSS, etc. cannot grasp the change of the location information of the UE#2. In contrast to this, the UE#2 can notify the M2M service PF 30 of the change of the location information by notifying the M2M service PF 30 of the location information as application information.

In addition, when the CBC 50 receives the newest location information from the MME or the HSS, etc., the following effects are also produced. In this case, notification of the change of the location information is performed using a control message in the core network 90, etc. Therefore, compared with the case where notification of the location information is performed as the application information, change processing of the location information can be completed at an early stage. Therefore, compared with the case of receiving updated distribution region information from the M2M service PF 30, the CBC 50 can decide the distribution destination node at an early stage.

(Embodiment 5)

Subsequently, operation of designating a period when broadcast and distribution to the UE is performed will be explained using FIGS. 5, 6A, and 6B. As explained in FIG. 6A, when the eNB receives the Write-REPLACE WARNINT REQUEST, it performs broadcast distribution (S24). Furthermore, as explained in FIG. 6B, when the eNB performs broadcast distribution, it transmits a distribution result notification to the MME (S101). The SCS 40A receives the distribution result notification through steps S101, S102, S103, and S104. Here, the SCS 40A may set a Device-Notification-Answer of the Tsp IF used as a distribution result response information to instruct to perform broadcast distribution again to the same area as the area to which broadcast distribution is performed in step S24, and may transmit this information to the MTC IWF 40B. Data broadcasted and distributed again may be the same as the data transmitted in step S24, or may be different therefrom.

In a manner as described above, broadcast distribution can be repeatedly executed within a predetermined period in the SCS 40A.

Alternatively, in step S13 of FIG. 5, the SCS 40A may set information indicating a period when broadcast distribution to the Device-Action-Request as the distribution request is performed, and may transmit this information to the MTC IWF 40B. The MTC IWF 40B, the CBC 50, or the MME that have received the information indicating the period when broadcast distribution is performed as described above may autonomously repeatedly execute the broadcast distribution within a designated period.

For example, in a case where the MTC IWF 40B controls broadcast distribution to be repeatedly executed, when the MTC IWF 40B receives the distribution result notification in step S103 of FIG. 6B, it may decide whether to execute the broadcast distribution again or to stop the broadcast distribution, and may give the CBC 50 a notification informing it of the decision made.

Alternatively, in a case where the CBC 50 controls broadcast distribution to be repeatedly executed, when the CBC 50 receives the distribution result notification in step S102 of FIG. 6B, it may decide whether to execute the broadcast distribution again or to stop the broadcast distribution, and may give the MME a notification informing it of the decision made.

Alternatively, in a case where the MME controls broadcast distribution to be repeatedly executed, when the CBC 50 receives the distribution result notification in step S101 of FIG. 6B, it may decide whether to execute the broadcast distribution again or to stop the broadcast distribution, and may give the eNB a notification informing it of the decision made.

As explained above, distribution data can be repeatedly transmitted by controlling the broadcast distribution in accordance with an embodiment 5 of the present invention. In addition, the SCS 40A transmits the information indicating the period when the broadcast distribution is performed to the MTC IWF 40B, the CBC 50, or the MME, and thereby repeated execution or stop of the broadcast distribution can be controlled in each node device.

(Other Embodiment)

Using FIG. 14, a network system when the SCS 40A, the MTC IWF 40B, and the CBC 50 in the above-mentioned embodiments 1 to 4 are applied to a network prescribed in the technical specification of the 3GPP will be explained.

Figure 14:
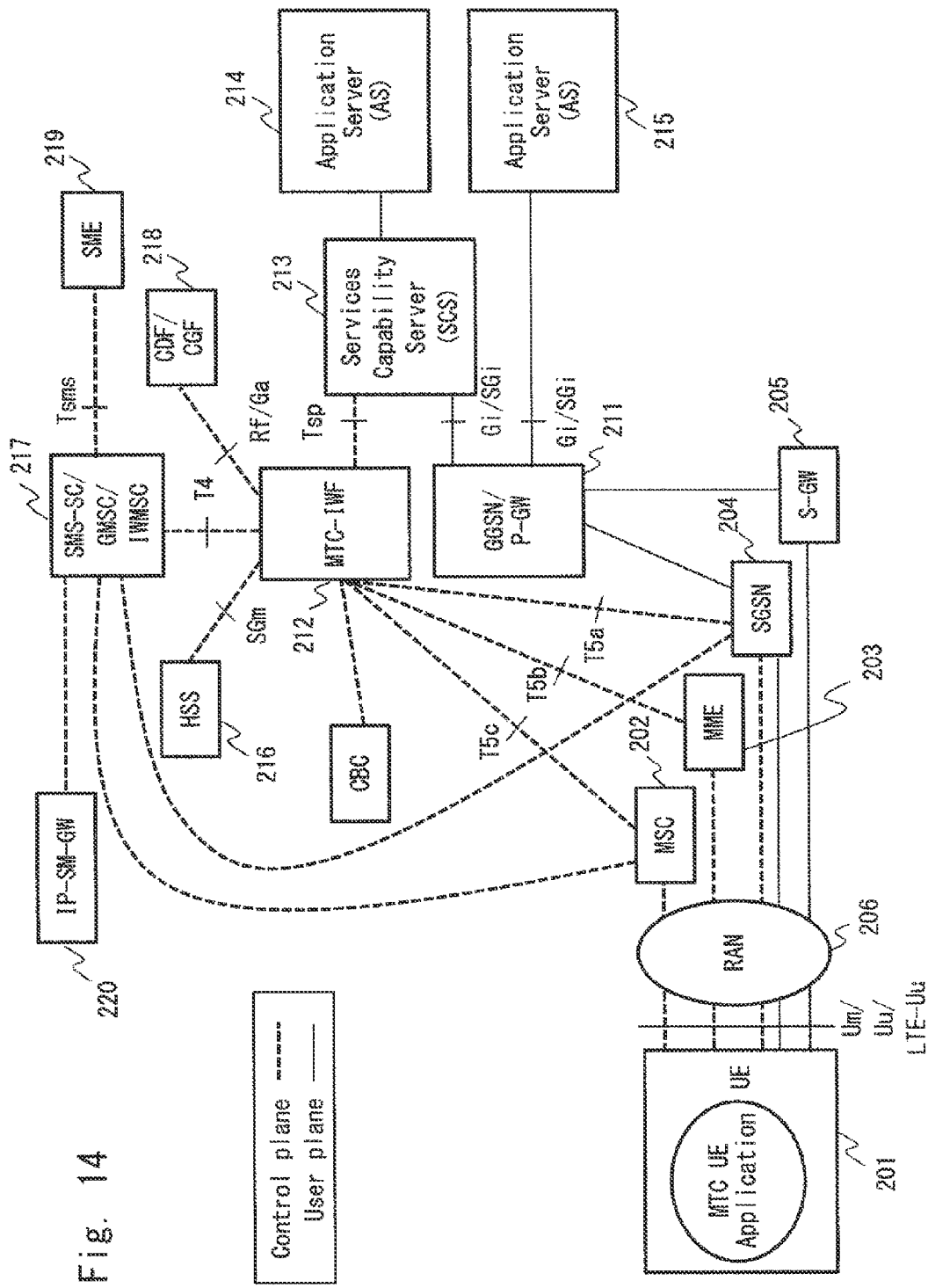
FIG. 14 is a diagram showing a network configuration prescribed in 3GPP.

The network system of FIG. 14 includes: UE (User Equipment) 201; a RAN (Radio Access Network) 206; a MSC (Mobile Switching Center) 202; an MME 203; an SGSN (Serving GPRS Support Node) 204; an S-GW 205; a GGSN (Gateway GPRS Support Node)/P-GW 211; an MTC-IWF 212; an SCS 213; ASs (Application Servers) 214 and 215; an HSS 216; an SMS-SC (Short Message Service-Service Center)/GSMSC/IWMSC 217; a CDF (Charging Data Function)/CGF (Charging Gateway Function) 218; an SME (Short Message Entity) 219; and an IP-SM-GW 220.

The MTC-IWF 212 and the SCS 213 are arranged so as to relay communication between the MSC 202, the MME 203, the SGSN 204, and the AS 214. Here, the AS 214 is arranged in an external communication network different from a mobile communication network. The MTC-IWF 212 is arranged in the mobile communication network. The SCS 213 may be arranged in either the mobile communication network or the external communication network. That is, an arrangement location of the SCS 213 depends on network design policies of a network operator, an AS business operator, etc. Furthermore, the MTC-IWF 212 and a CBC 111 are connected to each other in order to perform information distribution according to the plurality of events that different organizations notify of utilizing the emergency information distribution system.

Although the present invention has been explained as a hardware configuration in the above-mentioned embodiments, it is not limited to this. The present invention can achieve processing of the control unit in the gateway device 40 by making a CPU (Central Processing Unit) execute a computer program.

In the above-mentioned example, the program can be stored using various types of non-transitory computer readable media, and can be supplied to a computer. The non-transitory computer readable media include various types of tangible storage media. Examples of the non-transitory computer readable medium include: a magnetic recording medium (for example, a flexible disk, a magnetic tape, a hard disk drive); a magnetic optical recording medium (for example, a magnetic optical disk); a CD-ROM (Read Only Memory); a CD-R; a CD-R/W; and a semiconductor memory (for example, a mask ROM, a PROM (Programmable ROM), an EPROM (Erasable PROM), a flash ROM, an RAM (Random Access Memory)). In addition, the program may be supplied to the computer by various types of transitory computer readable media. Examples of the transitory computer readable media include an electrical signal, an optical signal, and an electromagnetic wave. The transitory computer readable medium can supply the program to the computer through a wired communication channel, such as an electric wire and an optical fiber, or a wireless communication channel.

Note that the present invention is not limited to the above-described embodiments, and that they can be appropriately changed without departing from the spirit of the invention.

Hereinbefore, although the invention in the present application has been explained with reference to the embodiments, the invention in the present application is not limited by the above. Various changes that those skilled in the art can understand within the scope of the invention can be made to a configuration and a detail of the invention in the present application.

This application claims priority based on Japanese Patent Application No. 2012-260718 filed on Nov. 29, 2012, and the entire disclosure thereof is incorporated herein.

REFERENCE SIGNS LIST 10 event detection device
20 distribution device
30 M2M service PF
40 gateway device
40A SCS
40A_1 SCS
40A_2 SCS
40B MTC IWF
41 service PF interface
42 CBC interface
43 control unit
44 notification unit
45 NW configuration information DB
46 priority information DB
47 data format information DB
50 CBC
60 mobile management node
70 radio base station
80 mobile terminal
90 core network
201 UE
202 MSC
203 MME
204 SGSN
205 S-GW
206 RAN
211 GGSN/P-GW
212 MTC-IWF
213 SCS
214 AS
215 AS
216 HSS
217 SMS-SC/GSMSC/IWMSC
218 CDF/CGF
219 SME
220 IP-SM-GW

The invention claimed is:

1. An information distribution system comprising:
an external network including an event detection device; and
a mobile communication network including a service control device, a gateway device and a broadcast distribution device, and wherein
the event detection device is configured to:
detect occurrence of at least one event,
designate distribution region information indicating a distribution region of event information based on the event, and
transmit the distribution region information to the service control device,
the service control device is configured to:
receive the distribution region information from the event detection device, and
transmit information on the distribution region information to the gateway device,
the gateway device is configured to:
receive the information on the distribution region information from the service control device,
specify a distribution node which is configured to broadcast simultaneous transmission information to a mobile station in the distribution region based on the information on the distribution region information, and
transmit distribution node information indicating the specified distribution node and information on the mobile station to the broadcast distribution device, and
the broadcast distribution device is configured to:
receive the distribution node information and the information on the mobile station from the gateway device,
transmit simultaneous transmission information on the event and the information on the mobile station to the distribution node, and
make the mobile station determine whether or not the simultaneous transmission information is addressed to the mobile station.

2. The information distribution system according to claim 1, wherein
the information on the distribution region information includes a distribution region ID associated with the distribution region information in the mobile communication network, and
the gateway device is configured to specify the distribution node in the distribution region indicated by the distribution region ID.

3. The information distribution system according to claim 1, wherein
the information on the distribution region information includes GPS information indicating the distribution region, and
the gateway device is configured to specify the distribution node in a predetermined range centering on a point indicated by the GPS information.

4. The information distribution system according to claim 1, wherein
the information on the distribution region information includes information on a specific mobile station, and
the gateway device is configured to specify the distribution node in a predetermined range centering on a point where the specific mobile station is located.

5. The information distribution system according to claim 4, wherein
the gateway device is configured to specify the distribution node in the predetermined range centering on the point where the specific mobile station is located after elapse of a predetermined time according to movement characteristics of the specific mobile station.

6. The information distribution system according to claim 1, wherein
the service control device is configured to transmit a Device-Action-Request including the information on the distribution region information to the gateway device.

7. The information distribution system according to claim 1, wherein
the event detection device is configured to transmit a broadcast request to the service control device, and
the service control device is configured to:
receive the broadcast request from the event detection device, and
determine whether to broadcast the simultaneous transmission information based on the broadcast request.

8. The information distribution system according to claim 1, wherein
the event detection device is configured to transmit a broadcast request to the service control device, and
the service control device is configured to:
receive the broadcast request from the event detection device, and
generate accounting information that the event detection device is billing destination.

9. The information distribution system according to claim 8, wherein
the accounting information is generated based on at least one of the distribution region, the number of transmission times of the simultaneous transmission information, and the number of mobile stations that receive the simultaneous transmission information.

10. The information distribution system according to claim 1, wherein
the service control device is configured to transmit the event information to the gateway device, and
the gateway device is configured to:
receive the event information from the service control device, and
specify the priority order regarding the event based on the event information.

11. The information distribution system according to claim 10, wherein
the service control device is configured to transmit a Device-Action-Request including the event information to the gateway device.

12. The information distribution system according to claim 1, wherein
the broadcast distribution device is configured to transmit a WRITE-REPLACE WARNING REQUEST including the information on the mobile station to the distribution node.

13. The information distribution system according to claim 1, wherein
the service control device is configured to transmit a validity period to broadcast the simultaneous transmission information to the gateway device.

14. The information distribution system according to claim 13, wherein
the distribution node is configured to:
broadcast the simultaneous transmission information to the mobile station, and
transmit a distribution result notification to the gateway device through the broadcast distribution device, and
the gateway device is configured to transmit to the broadcast distribution device information indicating broadcasting the simultaneous transmission information again when the gateway device receives the distribution result notification within the validity period.

15. The information distribution system according to claim 13, wherein
the service control device is configured to transmit the validity period to the broadcast distribution device through the gateway device.

16. The information distribution system according to claim 15, wherein
the distribution node is configured to
broadcast the simultaneous transmission information to the mobile station, and
transmit a distribution result notification to the broadcast distribution device, and
the broadcast distribution device is configured to transmit to the distribution node information indicating broadcasting the simultaneous transmission information again when the broadcast distribution device receives the distribution result notification within the validity period.

17. The information distribution system according to claim 13, wherein
the service control device is configured to transmit a Device-Action-Request including the validity period to the gateway device.

18. A service control device in a mobile communication network comprising:
a receiver configured to receive distribution region information indicating a distribution region of event information based on at least one event, from an event detection device included in an external network, occurrence of the event being detected by the event detection device; and
a transmitter configured to transmit information on the distribution region information to a gateway device that is configured to specify a distribution node which is configured to broadcast simultaneous transmission information to a mobile station in the distribution region based on the information on the distribution region information, and wherein
the gateway device is configured to transmit distribution node information and information on the mobile station to a broadcast distribution device, and the broadcast distribution device is configured to make the mobile station determine whether or not the simultaneous transmission information is addressed to the mobile station.

19. The service control device according to claim 18, wherein
the transmitter is configured to transmit a distribution region ID associated with the distribution region information in a mobile communication network for the gateway device specifying the distribution node in the distribution region indicated by the distribution region ID.

20. The service control device according to claim 18, wherein
the transmitter is configured to transmit GPS information indicating the distribution region for the gateway device specifying the distribution node in a predetermined range centering on a point indicated by the GPS information.

21. The service control device according to claim 18, wherein
transmitter is configured to transmit information on a specific mobile station for the gateway device specifying the distribution node in a predetermined range centering on a point where the specific mobile station is located.

22. The service control device according to claim 18, wherein
the transmitter is configured to transmit a Device-Action-Request including the information on the distribution region information to the gateway device.

23. The service control device according to claim 18, further comprising
at least one processor, and wherein
the receiver is configured to receive a broadcast request for broadcasting from the event detection device, and
the processor is configured to process to determine whether to broadcast the simultaneous transmission information based on the broadcast request.

24. The service control device according to claim 18, wherein
the transmitter is configured to transmit the event information to the gateway device.

25. The service control device according to claim 24, wherein
the transmitter is configured to transmit a Device-Action-Request including the event information to the gateway device.

26. The service control device according to claim 18, wherein
the transmitter is configured to transmit the gateway device, a validity period to broadcast the simultaneous transmission information.

27. The service control device according to claim 26, wherein
the transmitter is configured to transmit the validity period to the broadcast distribution device through the gateway device.

28. The service control device according to claim 26, wherein
the transmitter is configured to transmit a Device-Action-Request including the validity period to the gateway device.

29. A gateway device in a mobile communication network comprising:
a receiver configured to receive information on distribution region information indicating a distribution region of event information based on at least one event, from a service control device in the mobile communication network, the event being detected by an event detection device in an external network;
at least one processor configured to process to specify a distribution node which is configured to broadcast simultaneous transmission information to a mobile station in the distribution region based on the information on the distribution region information; and
a transmitter configured to transmit distribution node information indicating the specified distribution node and information on the mobile station to a broadcast distribution device in the mobile communication network, and wherein
the broadcast distribution device is configured to make the mobile station determine whether or not the simultaneous transmission information is addressed to the mobile station.

30. The gateway device according to claim 29, wherein
the information on the distribution region information includes a distribution region ID associated with the distribution region information in a mobile communication network, and
the processor is configured to process to specify the distribution node in the distribution region indicated by the distribution region ID.

31. The gateway device according to claim 29, wherein
the information on the distribution region information includes GPS information indicating the distribution region, and
the processor is configured to process to specify the distribution node in a predetermined range centering on a point indicated by the GPS information.

32. The gateway device according to claim 29, wherein
the information on the distribution region information includes information on a specific mobile station, and
the processor is configured to process to specify the distribution node in a predetermined range centering on a point where the specific mobile station is located.

33. The gateway device according to claim 32, wherein
the processor is configured to process to specify the distribution node in the predetermined range centering on the point where the specific mobile station is located after elapse of a predetermined time according to movement characteristics of the specific mobile station.

34. The gateway device according to claim 29, wherein
the receiver is configured to receive the broadcast request from the event detection device, and
an processor is configured to process to generate accounting information that the event detection device is billing destination.

35. The gateway device according to claim 34, wherein
the accounting information is generated based on at least one of the distribution region, the number of transmission times of the simultaneous transmission information, and the number of mobile stations that receive the simultaneous transmission information.

36. The gateway device according to claim 29, wherein
the receiver is configured to receive the event information from the service control device, and
the processor is configured to process to specify the priority order regarding the event based on the event information.

37. The gateway device according to claim 29, wherein
the processor is configured to process to transmit the simultaneous transmission information to the broadcast distribution device, when receiving distribution result notification indicating of completing to broadcast the simultaneous transmission information from the distribution node, within a validity period when the simultaneous transmission information is broadcast.

38. A control method of a service control device in a mobile communication network, comprising:

receiving distribution region information indicating a distribution region of event information based on at least one event, from an event detection device included in an external network, occurrence of the event being detected by the event detection device; and transmitting information on the distribution region information to a gateway device that is configured to specify a distribution node which is configured to broadcast simultaneous transmission information to a mobile station in the distribution region based on the information on the distribution region information, and wherein the gateway device is configured to transmit distribution node information and information on the mobile station to a broadcast distribution device, and the broadcast distribution device is configured to make the mobile station determine whether or not the simultaneous transmission information is addressed to the mobile station.

39. A control method of a gateway device in a mobile communication network, comprising:

receiving information on distribution region information indicating a distribution region of event information based on at least one event, from a service control device in the mobile communication network, the event being detected by an event detection device in an external network;

specifying a distribution node which is configured to broadcast simultaneous transmission information to a mobile station in the distribution region based on the information on the distribution region information; and transmitting distribution node information indicating the specified distribution node and information on the mobile station to a broadcast distribution device in the mobile communication network, and wherein the broadcast distribution device is configured to make the mobile station determine whether or not the simultaneous transmission information is addressed to the mobile station.

\* \* \* \* \*